(12) United States Patent
Kaneda et al.

(10) Patent No.: US 12,526,002 B2
(45) Date of Patent: Jan. 13, 2026

(54) INTERFERENCE SUPPRESSION APPARATUS, SYSTEM, INTER-BASE STATION CONTROL METHOD AND PROGRAM

(71) Applicant: SoftBank Corp., Tokyo (JP)

(72) Inventors: Takuya Kaneda, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 19/104,416

(22) PCT Filed: Aug. 8, 2023

(86) PCT No.: PCT/JP2023/028871
§ 371 (c)(1),
(2) Date: Jun. 25, 2025

(87) PCT Pub. No.: WO2024/043072
PCT Pub. Date: Feb. 29, 2024

(65) Prior Publication Data
US 2025/0323674 A1 Oct. 16, 2025

(30) Foreign Application Priority Data

Aug. 23, 2022 (JP) .................................. 2022-132617

(51) Int. Cl.
*H04B 1/10* (2006.01)
(52) U.S. Cl.
CPC ....................................... *H04B 1/10* (2013.01)
(58) Field of Classification Search
CPC .......... H04B 1/04; H04B 1/0475; H04B 1/06; H04B 1/10; H04B 7/02; H04B 7/022;
(Continued)

(56) References Cited

U.S. PATENT DOCUMENTS

| 7,773,949 B2 * | 8/2010 | Je | H04B 7/0626 |
| | | | 455/63.1 |
| 9,258,068 B2 * | 2/2016 | Wang | H04B 17/382 |
| 10,320,431 B2 * | 6/2019 | Wu | H04B 1/0475 |

FOREIGN PATENT DOCUMENTS

| JP | 2007-513584 A | 5/2007 |
| JP | 2015-510297 A | 4/2015 |

OTHER PUBLICATIONS

Kaneda et al., "Uplink Interference Canceller by using Cooperative Control Network in HetNet Construction", vol. J104-B, No. 8, pp. 723-726,2021, (English text). (Year: 2021).*

(Continued)

*Primary Examiner* — Quochien B Vuong
(74) *Attorney, Agent, or Firm* — Westborough IP Group, LLC

(57) ABSTRACT

In a HetNet configuration in which plural small-sized second cells are disposed in a first cell, an amount of signal processing for suppressing interference from other cells with respect to a reception signal on an uplink line of a base station of any one of the cells is reduced. An interference suppression apparatus creates a first propagation-path response matrix including a plurality of first propagation-path responses from terminals of plural second cells to a first base station, creates a second propagation-path response matrix including a plurality of second propagation-path responses from terminals of plural second cells to plural second base stations, calculates plural reception weights based on the first propagation-path response matrix and an inverse matrix of the second propagation-path response matrix, and suppresses interference to an uplink of the first base station, based on a reception signal of the first base station, reception signals of the plural second base stations and the plural reception weights. The interference suppression apparatus sets to zero a second propagation-path (Continued)

response having an electric power of magnitude equal to or less than a predetermined threshold value or less than the threshold value among the plurality of the second propagation-path responses included in the second propagation-path response matrix before calculating the inverse matrix.

18 Claims, 14 Drawing Sheets

(58) Field of Classification Search
CPC ........ H04B 7/08; H04W 16/24; H04W 16/26; H04W 16/32; H04W 24/00; H04W 24/02; H04W 24/04

See application file for complete search history.

(56) References Cited

OTHER PUBLICATIONS

International Search Report and Written Opinion, Dated Sep. 5, 2023.
Decision To Grant a Patent, Dated Dec. 19, 2023.
Notice of Reasons for Refusal, Dated Aug. 29, 2023.
Takuya Kaneda, et al., "Uplink Interference Canceller by using Cooperative Control Network in HetNet Construction", vol. J104-B, No. 8, pp. 723-726, 2021.
Takuya Kaneda, et al., "Processing Volume Reduction of Uplink Interference Canceller of Macrocell in HetNet Construction", 2021.
Atsushi Nagate, et al., "Layered Cell Configuration for 3D Dense Cell Structure", IEICE Technical Report, SR2016-5, SRW2016-5, May 2016.
Atsushi Nagate, et al., "Experimental Evaluations of Coordinated Interference Control for Co-channel Overlaid Cell Structure", Feb. 14, 2025, IEEE Xplore.
Takao Okamawari, et al, "Field evaluation of eICIC using highly accurate GPS based synchronization scheme", Feb. 14, 2025, IEEE Xplore.
International Preliminary Report on Patentability, Dated Feb. 25, 2025.

* cited by examiner

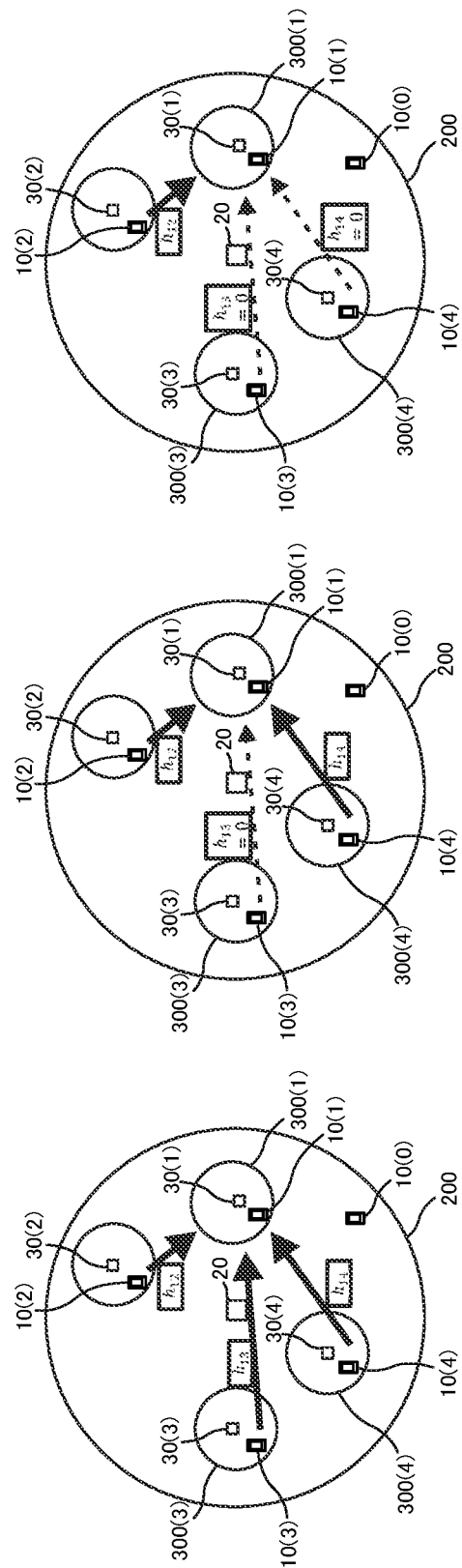

THE PROPAGATION PATH
RESPONSES ARE MEASURED
IN ADVANCE, WHEN DESIGNING
THE CELLS.

$\Gamma_{th}(= 0)$ $\Gamma_{th}(= 10)$ $\Gamma_{th}(= 20)$

INTERFERENCE SUPPRESSION APPARATUS, SYSTEM, INTER-BASE STATION CONTROL METHOD AND PROGRAM

TECHNICAL FIELD

The present invention relates to an interference suppression technique in a heterogeneous cellular network (HetNet) configuration in which different cell-sizes are mixed.

BACKGROUND ART

In order to cope with the rapid increase in traffic in mobile communication systems in recent years, there is a growing demand for small-cell base stations (also called "tiny-cell base stations", "pico-cell base stations", "femto-cell base stations", etc.), which have smaller cells (radio communication areas) than conventional macro-cell base stations. For example, in urban areas, in order to cope with localized sudden increases in traffic inside mid- and high-rise buildings (large offices), an attention has been focused on a three-dimensional spatial cell configuration (3D HetNet configuration) in which small cells are placed on each floor of a mid- or high-rise building located within a macro cell on the ground (see Non-Patent Literatures 1, 2 and 3). In particular, when the macro cell and the small cell use the same frequency, an interference between the macro cell and the small cell and an interference between the small cells become a problem respectively compared to a two-dimensional space HetNet configuration in which small cells are disposed on the ground, and it is necessary to avoid or suppress these interferences.

Non-Patent Literature 4 discloses a "reception-interference canceller for macro-cell base station by using cooperative network" as a countermeasure against an uplink interference in a three-dimensional space HetNet configuration, in which a macro cell and each of small cells work together to suppress an uplink interference from a terminal located in the small cell to the macro-cell base station at the macro-cell base station. This reception-interference canceller is a linear interference canceller that generates replica signals to remove each small-cell interference signal at the macro-cell base station, based on the reception signals of each small-cell base station within the same resource block, and subtracts them from the reception signals of the macro-cell base station.

CITATION LIST

Non-Patent Literature

Non-Patent Literature 1: A. Nagate, M. Mikami, T. Okamawari, T. Fujii, "Layered Cell Configuration for 3D Dense Cell Structure", International Workshop on Smart Wireless Communications (SmartCom2016), vol. 116, no. 29, SR2016-5, pp. 9-14, Oulu, Finland, May 2016.
Non-Patent Literature 2: A. Nagate, S. Nabatame, K. Hoshino and T. Fujii, "Experimental Evaluations of Coordinated Interference Control for Co-channel Overlaid Cell Structure", Proceedings of IEEE VTC2015-Spring, Glasgow, May 2015.
Non-Patent Literature 3: T. Okamawari, S. Shiobara, Y. Nagai and T. Fujii, "Field evaluation of eICIC using highly accurate GPS based synchronization scheme", Proceedings of IEEE VTC2015-fall, Boston, USA, September 2015.
Non-Patent Literature 4: Takuya Kaneda, Teruya Fujii, "Uplink Interference Canceller for by using Cooperative Control Network in HetNet Construction," IEICE Transactions on Information and Communication Engineers, Vol. J104-B, No. 8, pp. 723-726.

SUMMARY OF INVENTION

Technical Problem

The above-described conventional reception-interference canceller is an interference suppression technique for all terminals located in the macro cell and small cells in the same resource block, and can achieve a very large interference suppression effect. However, there is a problem in which that the amount of signal processing increases as the number of the small cells increases.

Solution to Problem

An interference suppression apparatus according to an aspect of the present invention is an interference suppression apparatus for suppressing interference from terminals located in plural other cells to a base station of any one cell of a first cell and the plural second cells in a cellular network configuration that uses a same frequency band and includes the first cell formed by a first base station and plural second cells formed within the first cell by plural second base stations. This interference suppression apparatus comprises a matrix creation section that estimates a plurality of first propagation-path responses from plural terminals respectively located in the plural other cells to an antenna of the base station of the one cell, creates a first propagation-path response matrix including the plurality of the first propagation-path responses as elements, estimates a plurality of second propagation path-responses from plural terminals respectively located in the plural other cells to antennas of base stations of the plural other cells, and creates a second propagation-path response matrix including the plurality of the second propagation-path responses as elements; a weight calculation section that calculates an inverse matrix of the second propagation-path response matrix, and calculates plural reception weights to be applied to reception signals received by the antennas of the base stations of the plural other cells, based on the first propagation-path response matrix and the inverse matrix of the second propagation-path response matrix; and a reception-signal processing section that suppresses interference from plural terminals located in the plural other cells to an uplink of the base station of the one cell based on a reception signal received by the antenna of the base station of the one cell, plural reception signals received by the antennas of the base stations of the plural other cells, and the plural reception weights, and the interference suppression apparatus sets to zero a second propagation-path response having an electric power of magnitude equal to or less than a predetermined threshold value or less than the threshold value among the plurality of the second propagation-path responses included in the second propagation-path response matrix before calculating the inverse matrix.

A method according to another aspect of the present invention is a method for suppressing interference from terminals located in plural other cells to a base station of any one cell of a first cell and plural second cells in a cellular network configuration that uses a same frequency band and includes the first cell formed by a first base station and the plural second cells formed within the first cell by plural second base stations. This method includes estimating a plurality of first propagation-path responses from plural terminals respectively located in the plural other cells to an antenna of the base station of the one cell, creating a first propagation-path response matrix including the plurality of the first propagation-path responses as elements, estimating a plurality of second propagation-path responses from plural terminals respectively located in the plural other cells to antennas of base stations of the plural other cells, and creating a second propagation-path response matrix including the plurality of the second propagation-path responses as elements; calculating an inverse matrix of the second propagation path response matrix, and calculating plural reception weights to be applied to reception signals received by the antennas of the base stations of the plural other cells, based on the first propagation-path response matrix and the inverse matrix of the second propagation-path response matrix; suppressing interference from plural terminals located in the plural other cells to an uplink of the base station of the one cell based on a reception signal received by the antenna of the base station of the one cell, plural reception signals received by the antennas of the base stations of the plural other cells, and the plural reception weights; and setting to zero a second propagation-path response having an electric power of magnitude equal to or less than a predetermined threshold value or less than the threshold value among the plurality of the second propagation-path responses included in the second propagation-path response matrix before calculating the inverse matrix.

A program according to yet another aspect of the present invention is a program executed by a computer or processor provided in an interference suppression apparatus for suppressing interference from terminals located in plural other cells to a base station of any one cell of a first cell and plural second cells in a cellular network configuration that uses a same frequency band and includes a first cell formed by a first base station and plural second cells formed within the first cell by plural second base stations. This program includes a program code for estimating a plurality of first propagation-path responses from plural terminals respectively located in the plural other cells to an antenna of the base station of the one cell, creating a first propagation-path response matrix including the plurality of the first propagation-path responses as elements, estimating a plurality of second propagation-path responses from plural terminals respectively located in the plural other cells to antennas of base stations of the plural other cells, and creating a second propagation-path response matrix including the plurality of the second propagation-path responses as elements; a program code for calculating an inverse matrix of the second propagation-path response matrix, and calculating plural reception weights to be applied to reception signals received by the antennas of the base stations of the plural other cells, based on the first propagation-path response matrix and the inverse matrix of the second propagation-path response matrix; a program code for suppressing interference from plural terminals located in the plural other cells to an uplink of the base station of the one cell, based on a reception signal received by the antenna of the base station of the one cell, plural reception signals received by the antennas of the base stations of the plural other cells, and the plural reception weights; and a program code for setting to zero a second propagation-path response having an electric power of magnitude equal to or less than a predetermined threshold value or less than the threshold value among the plurality of the second propagation-path responses included in the second propagation-path response matrix before calculating the inverse matrix.

A system according to yet another aspect of the present invention comprises a first base station that forms a first cell and plural second base stations that respectively form plural second cells that respectively have a smaller cell size than the first cell disposed within the first cell, and this system is a system of a cellular network configuration that uses a same frequency band for a radio communication of a terminal located in the first cell and a radio communication of a terminal located in each of the plural second cells. This system comprises any one of the foregoing interference suppression apparatuses.

In the foregoing interference suppression apparatus, the foregoing system, the foregoing method and the foregoing program, the one cell may be the first cell, the base station of the one cell may be the first base station, the other cells may be the second cells, and the base stations of the other cells may be the second base stations.

In the foregoing interference suppression apparatus, the foregoing system, the foregoing method and the foregoing program, the one cell may be the second cell, the base station of the one cell may be the second base station, the other cells may be the first cell and other second cells, and the base stations of the other cells may be the first base station and other second base stations.

In the foregoing interference suppression apparatus, the foregoing system, the foregoing method and the foregoing program, an electric power of each of the plurality of the second propagation-path responses included in the second propagation-path response matrix before calculating the inverse matrix may be calculated, and a second propagation-path response in which the calculated value of electric power is equal to or less than a predetermined threshold value $\gamma_{th}$ or less than the threshold value $\gamma_{th}$ may be modified to zero. Herein, a second propagation-path response that is expected to have a small contribution to the interference among the plurality of the second propagation-path responses of the second propagation-path response matrix may be set to zero in advance, the second propagation-path response that is set to zero in advance among the plurality of the second propagation-path responses of the second propagation-path response matrix may not be estimated, and a second propagation-path response in which the calculated value of the electric power is equal to or less than a predetermined threshold value $\Gamma_{th}$ or less than the threshold value $\Gamma_{th}$ among the plurality of the second propagation-path responses that are not set to zero in advance may be modified to zero.

In the foregoing interference suppression apparatus, the foregoing system, the foregoing method and the foregoing program, a second propagation-path response that is expected to have a small contribution to the interference among the plurality of the second propagation-path responses of the second propagation-path response matrix may be set to zero in advance, and the second propagation-path response that is set to zero in advance among the plurality of the second propagation-path responses of the second propagation-path response matrix may not be estimated.

In the foregoing interference suppression apparatus, the foregoing system, the foregoing method and the foregoing program, the plurality of the second propagation-path responses before the plural second base stations start an operation may be estimated, and a second propagation-path response in which the calculated value of the electric power of the second propagation-path response is equal to or less than a predetermined threshold value $\Gamma_{th}$ or less than the threshold value $\Gamma_{th}$ among the plurality of the second propagation-path responses may be set to zero.

In the foregoing interference suppression apparatus, the foregoing system, the foregoing method and the foregoing program, a second propagation-path response that is to be set to zero in advance may be determined based on a positional relationship between the plural second base stations or a positional relationship between the plural second cells.

In the foregoing interference suppression apparatus, the foregoing system, the foregoing method and the foregoing program, the interference suppression apparatus may be provided in a common baseband processing section that is connected to each of a radio section of the first base station and radio sections of the plural second base stations via a communication line.

The program for performing at least one of the foregoing estimation of the propagation-path response, the foregoing creation of the propagation-path response matrix, the foregoing calculation of the reception weight and the foregoing suppression of the interference may be a trained model created by machine learning.

Advantageous Effects of Invention

According to the present invention, in a HetNet configuration in which plural small-sized second cells are disposed within a first cell, it is possible to suppress interference from the second cell to an uplink reception signal received by a base station of the first cell, reduce an amount of signal processing required for calculating reception weights to suppress the interference, and also reduce the number of measurements of a second propagation-path response (propagation-path response from a terminal of another cell to an antenna of a base station of the other cell) for all of the cells, which are required for the calculation.

BRIEF DESCRIPTION OF DRAWINGS

FIG. 9A is a diagram showing a specific example of the first method of reducing an amount of signal processing using a threshold value of reception electric power.

FIG. 9B is a diagram showing a specific example of the first method of reducing an amount of signal processing using a threshold value of reception electric power.

FIG. 9C is a diagram showing a specific example of the first method of reducing an amount of signal processing using a threshold value of reception electric power.

DESCRIPTION OF EMBODIMENTS

Hereinafter, various embodiments are described with reference to the drawings. It is noted that each drawing merely shows the shape, size and positional relationship in a schematic manner to enable the contents of the present invention to be understood, and therefore the present invention is not limited to only the shape, size and positional relationship exemplified in each drawing. Furthermore, the numerical values exemplified below are merely preferred examples of the present invention, and therefore the present invention is not limited to the exemplified numerical values.

The interference suppression apparatus (hereinafter also referred to as an "interference canceller") disclosed herein as an example of embodiment is a network-cooperative uplink interference canceller that suppresses interference signals from terminals of other cells in a first cell base station (macro-cell base station) or a second cell base station (small-cell base station), in a heterogeneous cellular network (HetNet) configuration (for example, a HetNet configuration in a two-dimensional space, or a HetNet configuration expanded to a three-dimensional space) with a mixture of heterogeneous cell sizes, which is configured by disposing plural second cells (small cells) using the same frequency within a first cell (macro-cell) and has a high frequency utilization efficiency. In particular, in the interference suppression apparatus (interference canceller) according to the embodiment of the present disclosure, even if the number of second cells (small cells) disposed in the first cell (macro cell) increases, it is possible to reduce the amount of calculation processing required to generate reception weights for interference cancellation and the number of measurements of inter-cell propagation-path responses required for the calculation.

Figure 1:
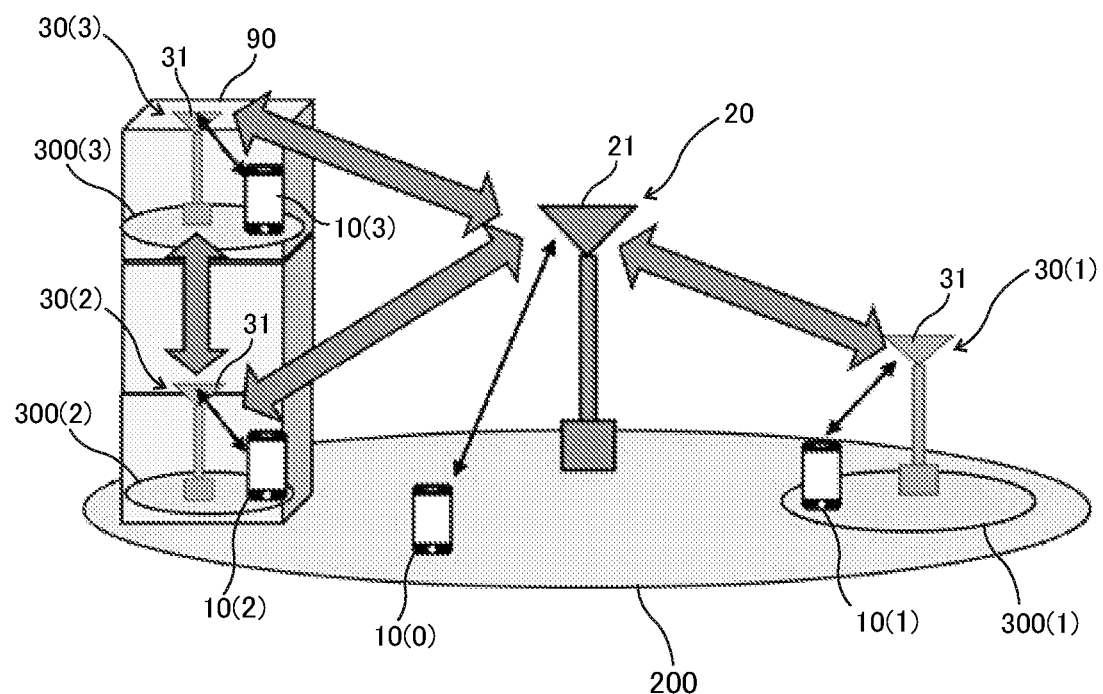
FIG. 1 is a diagram showing an example of a HetNet configuration to which a system including an interference suppression apparatus according to an embodiment can be applied and an example of interference between cells in the HetNet configuration.

FIG. 1 is a diagram showing an example of a HetNet configuration to which a system including an interference suppression apparatus according to an embodiment can be applied. In FIG. 1, the system of the present embodiment is provided with, as plural base stations for mobile communications (referred to as "eNodeB," "eNB," "gNodeB," "gNB," etc.), a macro-cell base station 20 as a first-cell base station that forms a macro cell 200 as a first cell, and plural small-cell base stations 30(1) to 30(3) as plural second base stations that form small cells 300(1) to 300(3) as plural second cells having a cell size smaller than the macro cell 200. The macro-cell base station 20 can wirelessly communicate with a terminal 10(0) located in the macro cell 200 via an antenna 21. At least an antenna 31 is disposed in each of the plural small-cell base stations 30(1) to 30(3) within the macro cell 200 of the macro-cell base station 20. The plural small-cell base stations 30(1) to 30(3) can respectively perform a wireless communication with terminals 10(1) to 10(3) located in the small cell 300(1) to 300(3) via the antenna 31.

The configuration in FIG. 1 is a "HetNet configuration" that is effective as a traffic countermeasure, in which the small cells 300(1) to 300(2) are disposed in areas with high traffic concentration, such as hot spots within the macro cell 200. In the present system, the macro cell and the small cells use the same frequency. In particular, in an urban area lined with buildings 90 as shown in FIG. 1, there are many cases where traffic is concentrated in large offices on high floors, and a "three-dimensional space HetNet configuration (three-dimensional space cell configuration)" is extremely effective, in which small cells are disposed in such locations. In the three-dimensional spatial cell configuration of FIG. 1, an outdoor small cell 300(1) is disposed in the lateral direction along the plane, and plural indoor small cells 300(2) and 300(3) are disposed in the direction along the height.

In the HetNet configuration, it possible to stabilize the overall communication quality by disposing the small cells 300(1) to 300(3) in locations with particularly high communication traffic in the macro cell 200 that performs wide-area communications.

It is noted that in FIG. 1, each of the number of the macro-cell base stations and the number of the small cell base stations is arbitrary. For example, the macro-cell base stations may be provided at two or more locations, and the small-cell base stations may be provided at four or more locations within the macro cell. Furthermore, the macro-cell base station and the small-cell base station are controlled in a time-synchronized manner with each other.

The macro-cell base station 20 is a wide-area base station that is disposed outdoors in a mobile communication network, which covers a macro cell that is a wide area usually with a radius of several hundred meters to several kilometers. The macro-cell base station 20 is connected to a core network of the mobile communication network via a line termination apparatus and a communication line such as an optical line or a dedicated line, and is capable of communicating with various nodes such as server apparatuses on the core network via a predetermined communication interface.

Unlike a wide area macro-cell base station, each of the small-cell base stations 30(1) to 30(3) is a base station with a small communication capacity, which has a radio-communicable distance of, for example, several tens to several hundreds of meters and can be disposed indoors such as in an ordinary home, store, or office. The small-cell base stations 30(1) to 30(3) are respectively provided to cover an area smaller than the area covered by a wide area macro-cell base station in the mobile communication network. The small-cell base stations 30(1) to 30(3) are connected to the core network of the mobile communication network via a line termination apparatus and a communication line such as an optical line or a dedicated line, and can communicate with various nodes such as server apparatuses on the core network via a predetermined communication interface.

The same radio transmission method and the same frequency band are used for a radio communication between the terminal and each of the macro-cell base station 20 and the small-cell base stations 30(1) to 30(3). By using the same frequency band, it is possible not to compress a total frequency band, compared to a case in which frequency bands different from each other are used for the macro cell and the small cell.

As a radio transmission method, for example, it can be adopted of a communication method such as the LTE (Long Term Evolution) or the LTE-Advanced, the 4th-generation mobile phone communication method, or the next-generation mobile phone communication method such as the 5th-generation or 6th-generation mobile phone communication method.

The terminal 10 is a cellular phone, a smartphone, a portable personal computer having a mobile communication function, or the like, and is also called a user equipment (UE), a mobile station, a mobile device, or a portable communication terminal. The terminal 10(0) is located in the macro cell 200 and communicates with the mobile communication network side via the macro-cell base station 20 corresponding to the macro cell 200. Furthermore, the terminals 10(1) to 10(3) are respectively located in the small cells 300(1) to 300(3) and communicate with the mobile communication network side via the small-cell base stations 30(1) to 30(3).

The terminal 10 is configured using hardware such as, for example, a computer apparatus having a CPU, memory, etc., and a radio communication section, and is capable of performing radio communications and the like with the macro-cell base station 20 and the small-cell base stations 30(1) to 30(3) by executing a predetermined program. Each of the macro-cell base station 20 and the small-cell base stations 30(1) to 30(3) is configured using hardware such as, for example, a computer apparatus having a CPU, memory, etc., an external-communication interface section for the core network, and a radio communication section, and is capable of performing a radio communication with the terminal 10 and a communication with the core network side by executing a predetermined program.

The terminal 10 may be a module-formed mobile station incorporated in a moving object such as an automobile or a drone, or may be a terminal apparatus of the device for IoT (Internet of Things).

Figure 2:
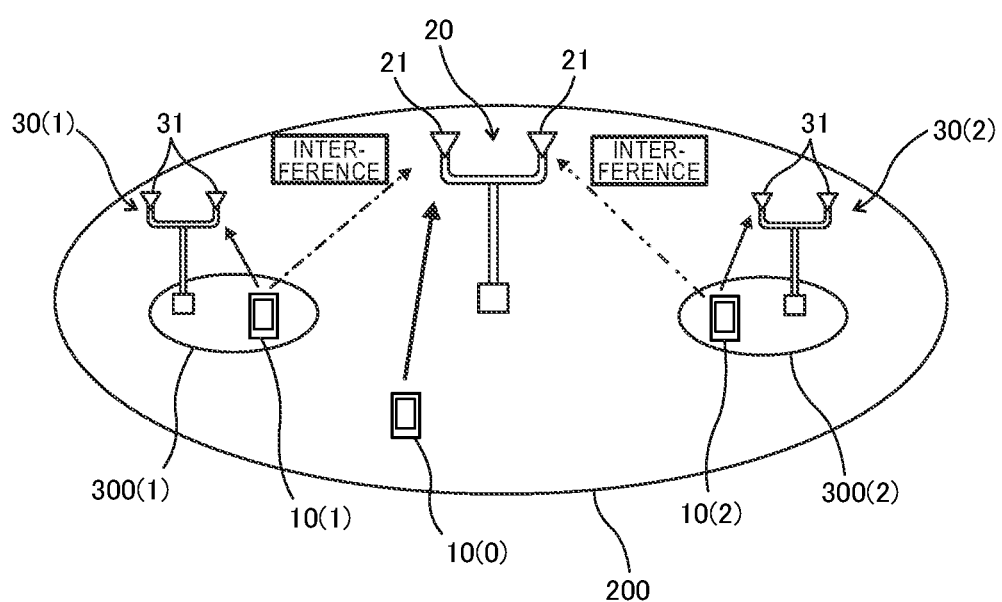
FIG. 2 is a diagram showing an example of a state of interference arriving at a first base station forming a first cell from a terminal located in a second cell in the HetNet configuration.

FIG. 2 is a diagram showing an example of state of interference arriving from a small cell terminal to a macro-cell base station with a HetNet configuration. In FIG. 2, as shown by the solid lines in the figure, the macro-cell terminal communicates with the macro-cell base station, and each of the small-cell terminals communicates with each of the small cell base stations. However, as indicated by the dashed and dotted lines in the figure, signals transmitted from terminals 10(1) and 10(2) located in the small cells 300(1) and 300(2) may reach the antenna 21 of the macro-cell base station 20, causing an interference of the signals from the small cells on the uplink of the macro cell, which may result in a degradation of communication quality of the macro cell. In particular, in the three-dimensional spatial HetNet configuration exemplified in FIG. 1, as shown by the arrows in the figure, an estimation of a giving interference and a receiving interference between the cells is extremely complicated. In addition, it is extremely difficult to construct a three-dimensional spatial cell configuration to avoid an interference with each other by providing a spatial separation distance between the cells. In order to realize a three-dimensional spatial cell configuration, an advanced interference control is essential.

In order to avoid the foregoing interference of the uplink of the macro cell, a method of reducing the transmission power of the terminals 10(1) and 10(2) located in the small cells 300(1) and 300(2) can be considered. However, this method results in a degradation of communication quality in the small cells 300(1) and 300(2).

As an inter-cell interference control technique applicable to the HetNet configuration, it is known of an inter-cell interference control technique called eICIC (enhanced Inter Cell Interference Coordination) that complies with the above-mentioned LTE-Advanced standard.

Figure 3:
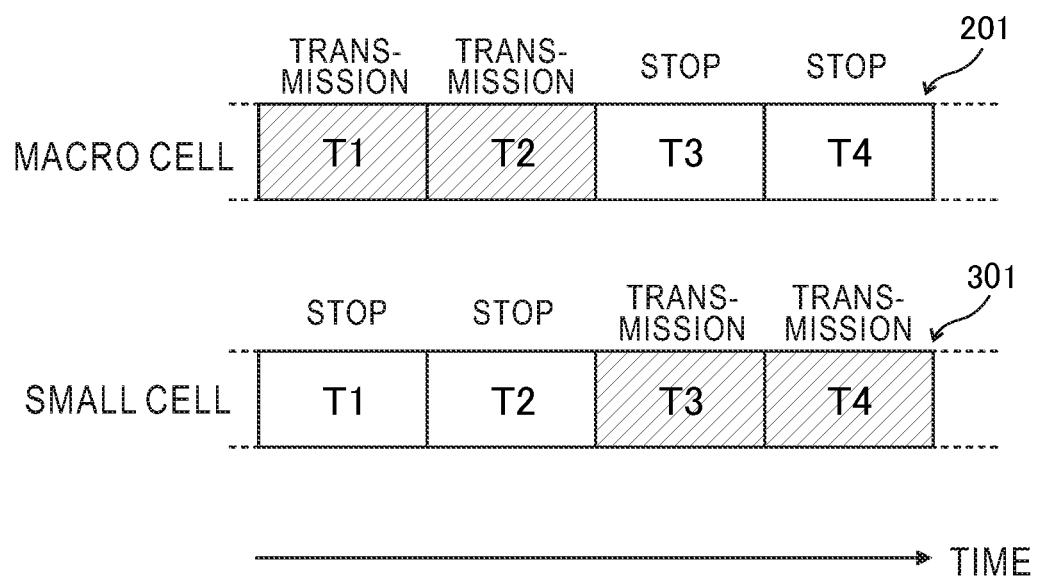
FIG. 3 is a diagram showing an arrangement example of time slots of radio resources that are set in each of a macro cell and a small cell in a conventional inter-cell interference control technique (eICIC).

FIG. 3 is a diagram showing an arrangement example of time slots of radio resources that are set in each of a macro cell and a small cell in a conventional inter-cell interference control technique (eICIC). As shown in FIG. 3, in the inter-cell interference control technique called eICIC, radio resources 201 and 301 in the same frequency band are time-divided, and time slots different from each other are assigned to transmissions from terminals in each of the macro cell and the small cell. For example, in the example of FIG. 3, time slots T1 and T2 are assigned to the macro cell, and time slots T3 and T4 are assigned to the small cell. This makes it possible to avoid the interferences between the macro cells and the small cells in the same frequency band. However, in the conventional inter-cell interference control technique (eICIC), since the radio resources (time slots) are divided in each of the macro cell and the small cell and a part of the divided radio resources is not used by each other, each of the base stations cannot use all bands of the radio resources (time slots), and the maximum transmission rate (peak throughput) of the macro cell and the small cell is reduced.

Therefore, in the present embodiment, as a countermeasure against the uplink interference in the HetNet configuration, it is provided with a function of an "uplink-interference canceller", which is an interference-suppression apparatus that suppresses an interference on the uplink using a "cooperative control network" in which the macro cell and each of the small cells cooperate with each other to perform a cooperative control.

Figure 4:
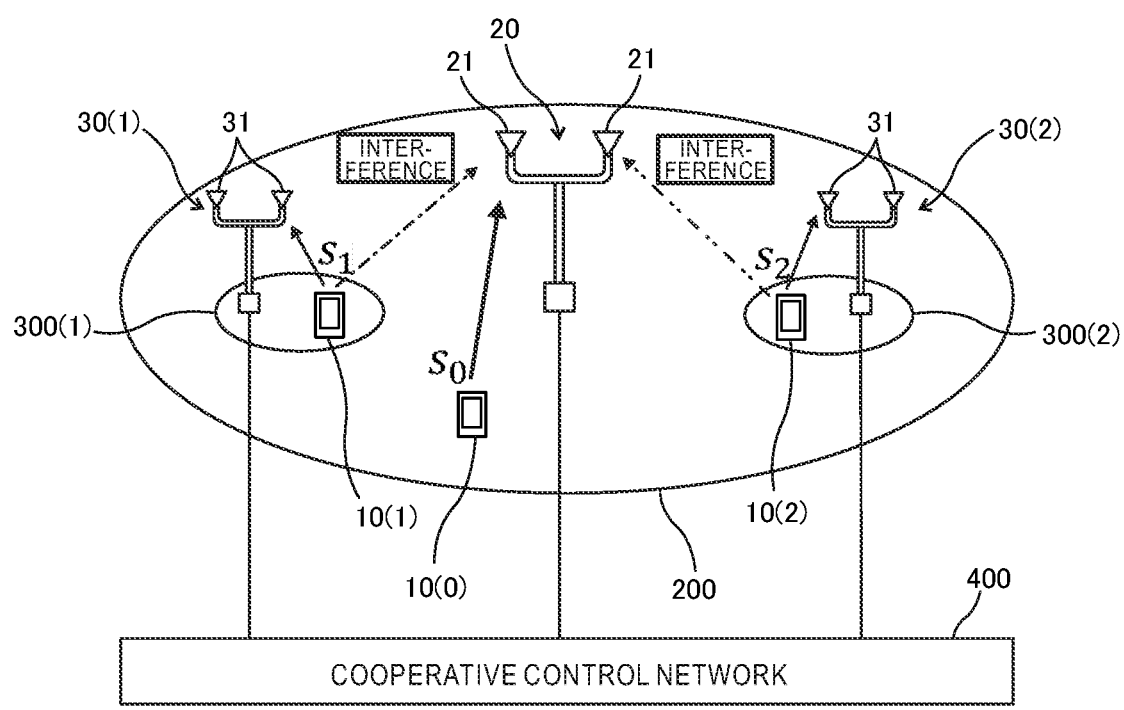
FIG. 4 is a diagram showing an example of a system using a cooperative control network having a function of an uplink interference canceller according to the embodiment.

FIG. 4 is a diagram showing an example of a system using a cooperative control network 400 having the function of the uplink-interference canceller according to the embodiment. In FIG. 4, an uplink desired signal (component s0) transmitted from the macro cell terminal 10(0) arrives at the antenna 21 of the macro-cell base station 20, and uplink signals transmitted from the small cell terminals 10(1) and 10(2) arrive at the antenna 21 as interference signals (components s1 and s2). When the interference signals s1 and s2 interfere with the desired signal s0, the communication quality of the uplink in the macro-cell base station 20 (macro cell uplink) deteriorates.

The system of the present embodiment includes a cooperative control network 400 having the function of the macro-cell uplink interference canceller, and thus can prevent the degradation of communication quality in the macro-cell uplink due to the interference signals from the other cells. In the macro-cell uplink interference canceller, in the cooperative control network 400 connected to each of the base station 20, 30(1) and 30(2), the interference in the uplink at the macro-cell base station 20 is suppressed by superimposing an interference-cancellation weight (reception weight) on the reception signal of each of the small-cell base station 30(1) and 30(2) and subtracting it from the reception signal of the macro-cell base station 20 (by adding to the interference signal component of the reception signal of the macro-cell base station 20 in reverse phase). That is, the macro-cell uplink interference canceller of the embodiment is a linear interference canceller that generates a replica signal for removing the interference signal from each of the small cell in the macro-cell base station 20 based on the reception signal of each of the small-cell base station 30(1) and 30(2) and subtracts the replica signal from the reception signal of the macro-cell base station 20, thereby achieving a significant interference suppression effect.

In FIG. 4, the interference due to the signals from the terminals in the other cells may also occur in a small-cell uplink of each of the plural small-cell base stations 30(1) and 30(2). For example, an uplink desired signal (component s1) transmitted from the small-cell terminal 10(1) of its own cell arrives at the antenna 21 of the small-cell base station 30(1), and the uplink signals transmitted from the macro cell terminal 10(0) and the small cell terminal 10(2) of the other cells arrive as interference signals (components s0 and s2). If the interference signals s0 and s2 interfere with the desired signal s1, the communication quality of the uplink (small-cell uplink) in the small-cell base station 30(1) deteriorates.

In particular, in the HetNet configuration, when the macro-cell terminal 10(0) approaches the small-cell base stations 30(1) and 30(2) and the base stations are subject to strong interference, or when the small cells 300(1) and 300(2) are disposed close to each other and are subject to strong interference from the other small-cell terminal, the communication quality of the uplink of each of the small-cell base station 30(1) and 30(2) is significantly degraded. For this reason, in the small-cell base stations 30(1) and 30(2), it is also preferable to suppress the interference from the macro-cell terminal and the interference from the other small-cell terminal.

In the system of the present embodiment, the cooperative control network 400 may have the function of the small-cell uplink interference canceller, and may be capable of preventing the degradation of communication quality of the small-cell uplink due to the interference signals from the other cells (macro cell, other small cells). In the small-cell uplink interference canceller, in the cooperative control network 400 connected to each of the base station 20, 30(1) and 30(2), for example, the interference in the uplink in the small-cell base station 30(1) may be suppressed by superimposing an interference-cancellation weight (reception weight) on the reception signals of the macro-cell base station 20 and the small-cell base station 30(2) and subtracting it from the reception signal of the macro-cell base station 20(1) (by adding to the reception signal of the small-cell base station 30(1) in reverse phase). That is, the small-cell uplink interference canceller of the embodiment generates replica signals for removing the interference signals from the macro cell and other small cell in the small cell base station 30(1) based on the reception signals of the macro-cell base station 20 and the small-cell base station 30(2), and functions as a linear interference canceller that subtracts these replica signals from the reception signals of the small-cell base station 30(1), thereby achieving a significant interference suppression effect.

The interference canceller provided in the cooperative control network 400 of the present embodiment is an interference-suppression technique capable of targeting all terminals in the macro cell and the small cells, and can obtain a very large interference-suppression effect; however, the amount of signal processing increases as the number of small cells disposed in the macro cell increases. In particular, when there are a large number of the small cells, the amount of signal processing becomes enormous.

Therefore, in the present embodiment, as shown below, the amount of signal processing is reduced by excluding small cells that are far away from each other and to which signals from the terminals hardly reach from the small cells that are taken into consideration when calculating the interference-cancellation weights for interference suppression and generating the replica signals.

[Basic Configuration of Uplink Reception Canceller]

Figure 5:
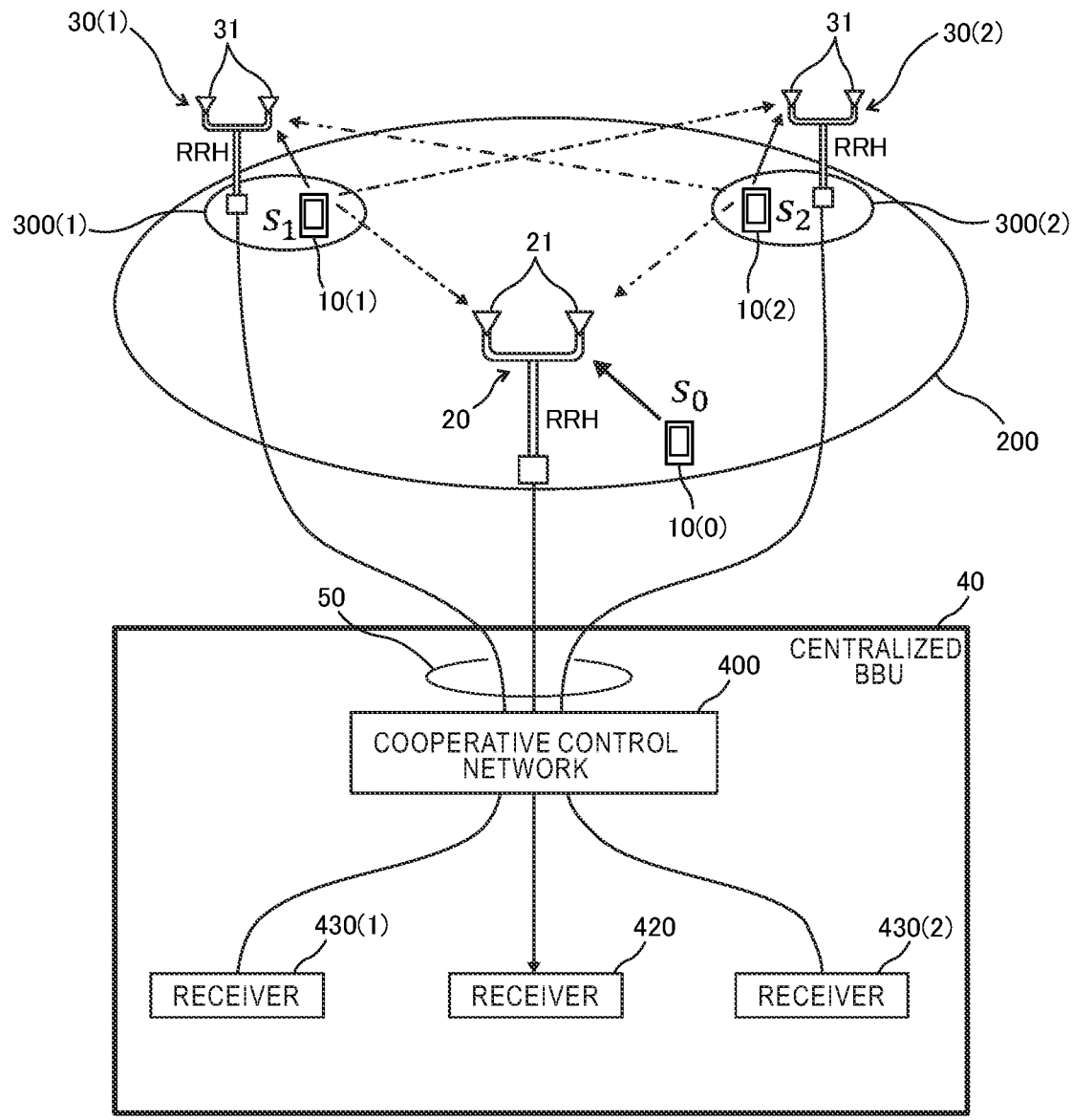
FIG. 5 is a diagram showing a configuration example of a system having a function of a reception-interference canceller of a base station in the system according to the embodiment.

FIG. 5 is a diagram showing a configuration example of a system having a function of a reception-interference canceller of a base station in the system according to the embodiment. It is noted that the mobile communication system in FIG. 5 shows an example on the basis of a C-RAN (Centralized-Radio Access Network) configuration; however, it may also be a mobile communication system with any other configuration such as a D-RAN (Distributed-Radio Access Network).

In FIG. 5, each of the macro-cell base station 20 and the small-cell base stations 30(1) and 30(2) is provided with an RRH (Remote Radio Header) (also called an "extended base station" or "optical extended apparatus") connected to each other via a wired communication line 50 such as a wired communication line or a radio communication line, such as a broadband optical fiber or an inter-base station interface (for example, an x2 interface in LTE), and a BBU (BaseBand Unit) that includes a baseband-signal processing section, a receiver and a transmitter. The BBU of each of the base stations 20, 30(1) and 30(2) is aggregated in a centralized BBU 40 that is a common baseband processing section installed in one location. The RRH of each of the base stations 20, 30(1) and 30(2) is provided, for example, in the vicinity of the antennas 21 and 31, and is connected to the centralized BBU 40 via the communication line 50. The RRH is also connected to each of the receiver 420, 430(1) and 430(2) via the cooperative control network 400 in the centralized BBU 40. The RRH of each base station converts a transmission signal from the centralized BBU 40 into a radio signal and transmits it from the antennas 21 and 31 with a predetermined transmission power, and converts a radio signal received by the antennas 21 and 31 into a reception signal and sends it to the centralized BBU 40. The cooperative control network 400 in the centralized BBU 40 can implement a macro-cell uplink reception-interference canceller and a small-cell uplink reception-interference canceller, which are described below.

Differences in propagation distances, differences in signal processing times and the like between the base station 20, 30(1), 30(2) and the centralized BBU 40 can be compensated for by digital signal processing in the centralized BBU 40.

In FIG. 5, for example, in the macro-cell base station 20, the reception quality (SINR characteristics) is deteriorated due to the interference signals S1 and S2 from the terminals 10(1) and 10(2) located in the small cells 300(1) and 300(2). In order to suppress (cancel) these interference signals, the reception signals of the macro-cell base station 20 and the small-cell base stations 30(1) and 30(2) are transferred to the cooperative control network 400 in the centralized BBU 40, and a process of reception-interference canceller is performed in which the interference signal replicas are generated based on the transferred reception signals and subtracted the generated interference signal replicas from the reception signals. This makes it possible to suppress the interference in the uplink of the macro-cell base station 20.

In the small-cell base station 30(1), the reception quality (SINR characteristics) deteriorates due to the interference signals S0 and S2 from the terminal 10(0) located in the macro cell 200 and the terminal 10(2) located in the small cell 300(2). In order to suppress (cancel) these interference signals, the reception signals of the macro-cell base station 20 and the small-cell base stations 30(1) and 30(2) are transferred to the cooperative control network 400 in the centralized BBU 40, and it is performed of a processing for generating the interference-signal replicas based on the transferred reception signals and subtracting the generated interference signal replicas from the reception signals. This makes it possible to suppress the interference in the uplink of the small-cell base station 30(1).

Next, it is described of a modeling of the reception signals of the base stations 20, 30(1) and 30(2), an example of the processing of the reception-interference canceller in the cooperative control network 400, and the evaluation results thereof in the HetNet configuration of the present embodiment. It is noted that in the following description, the interference suppression apparatus that suppresses an interference from a terminal (hereinafter also referred to as a "small-cell terminal") located in a small cell on the uplink to the macro-cell base station at the macro-cell base station is also referred to as a "macro-cell uplink interference canceller". In addition, the interference suppression apparatus that suppresses an interference from small cell terminals located in the other small cells and terminals located in the macro cell (hereinafter also referred to as "macro-cell terminals") in the uplink of the small-cell base station at the small-cell base station is also referred to as a "small-cell uplink interference canceller".

In the HetNet configuration exemplified in FIG. 5, with respect to the radio transmission method, it is assumed that a control signal of uplink includes, for example, a "cell-specific reference signal" that is code-multiplexed with individually different spreading code. In this way, each base station can accurately estimate the propagation-path response (hereinafter also referred to as "channel response") of its own cell signal and other cell signals. Although the insertion of the individual reference signals reduces a transmission efficiency to some extent, since the small cells 300(1) and 300(2) are assumed to be indoors, the movement speed of the small-cell terminals 10(1) and 10(2) is slow and the insertion interval on the time axis of the reference signals can be made significantly shorter than the insertion interval assuming a high-speed movement. Furthermore, the number of the users that can simultaneously use the same frequency (for example, the same resource block in LTE) in each of the cells 200, 300(1) and 300(2) is basically one, and an evaluation is performed under the strictest condition in which the same frequency is simultaneously used by the terminals in the macro cell 200 and the small cell 300(1) and 300(2).

[Reception Signal of Base Station in HetNet Configuration]

In the HetNet configuration of the present embodiment, as a receiving method for the uplink, a diversity receiving (SIMO) using the maximum ratio combining (MRC) is applied, in which the number of transmitting antennas is one and the number of receiving antennas is two. Herein, it is assumed that a terminal Mk in the k-th cell is communicating with a base station Bk, where k=0 is a macro cell and k=1, 2, . . . , N are small cells. If each of the reception channel responses from a terminal Mi to antennas #1 and #2 of a base station Bk is expressed as $$h_{ki}^{(1)}, h_{ki}^{(2)} \ (k, i = 0, ---, N),$$

the channel response matrix Hkk of the terminal Mk at the base station Bk can be expressed by the following equation (1).

$$H_{kk} = [h_{kk}^{(1)}, \ h_{kk}^{(2)}]^T \qquad (1)$$

Herein, T in the equation (1) represents a transposed matrix. Furthermore, the reception weight $W_k^{MRC}$ at the time of maximum ratio combining can be expressed by the following equation (2).

$$W_k^{MC} = \left[ \frac{h_{kk}^{(1)*}}{\sqrt{|h_{kk}^{(1)}|^2 + |h_{kk}^{(2)}|^2}}, \ \frac{h_{kk}^{(2)*}}{\sqrt{|h_{kk}^{(1)}|^2 + |h_{kk}^{(2)}|^2}} \right] \qquad (2)$$

Where, "*" in the equation (2) represents a complex conjugate number. Herein, if the transmission signal of the terminal Mk is sk, the reception signal of the base station Bk is Xk, and the noise signal is Nk, then the reception signal Xk of the base station Bk (k=0, . . . , N) can be expressed by the following equations (3) and (4), taking into account interference signals from other cells.

$$X_k = W_k^{MRC}\left(H_{kk}S_k + \sum_{i=0, i \neq k}^{N} H_{ki}S_i + N_k\right) \qquad (3)$$

$$= W_k^{MRC}H_{kk}S_k + \sum_{i=0, i \neq k}^{N} W_k^{MRC}H_{ki}S_i + W_k^{MRC}N_k$$

$$N_k = [N_k^{(1)} \ N_k^{(2)}]^T \qquad (4)$$

Herein, the second term on the right side of the equation (3) is the interference signals from the other cells.

[Calculation of Interference Canceller Weights]

Figure 6:
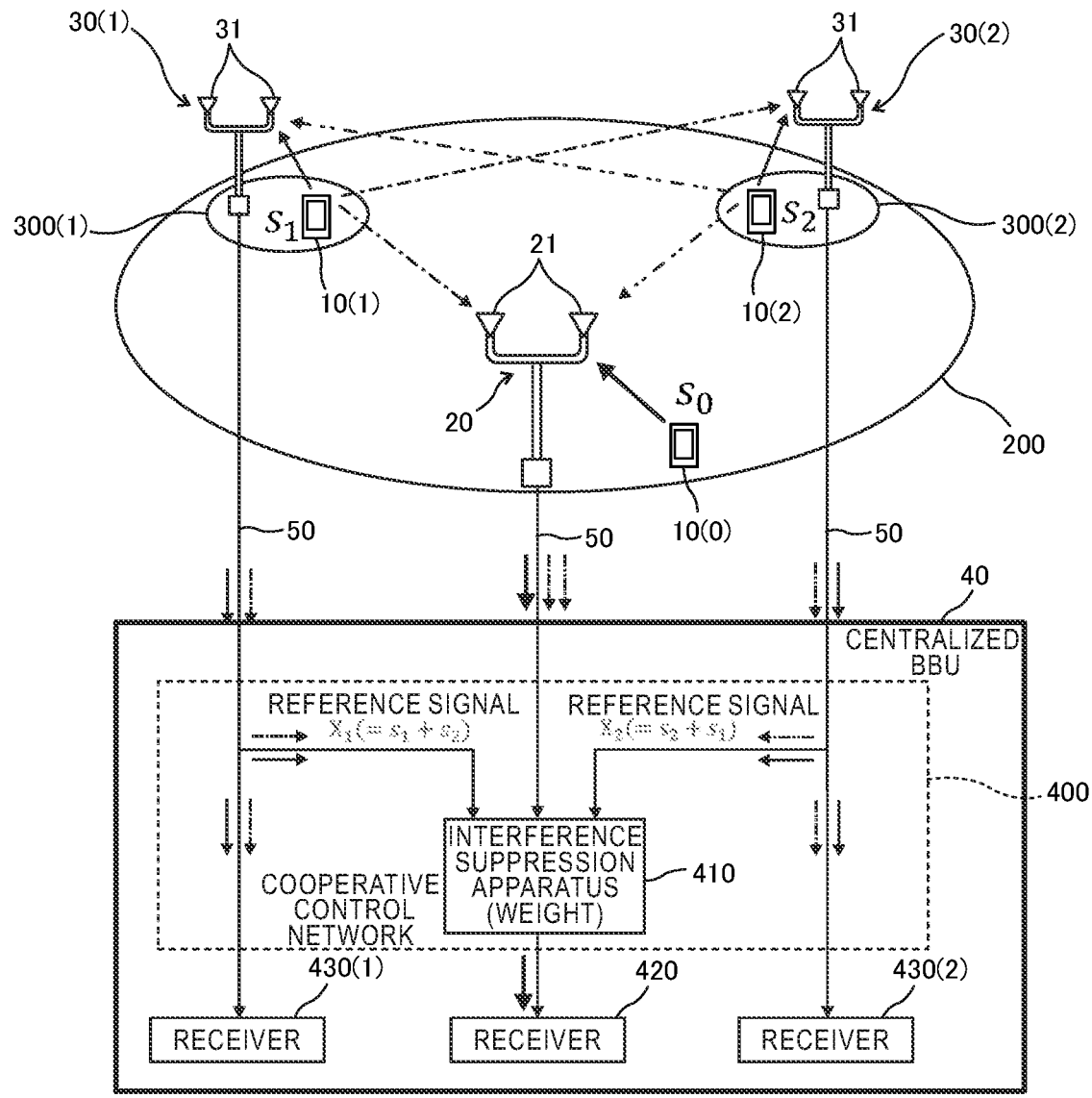
FIG. 6 is a diagram showing an example of configuration of an uplink reception-interference canceller in a macro-cell base station in the system according to the embodiment.

FIG. 6 is a diagram showing an example of configuration of a reception-interference canceller in a macro-cell base station (B0) 20, in which the diversity reception (SIMO) is applied to an uplink in the system according to the embodiment. In FIG. 6, the cooperative control network 400 installed in the centralized BBU 40 is provided with an interference suppression apparatus 410 having a function of a macro-cell uplink reception-interference canceller.

The interference suppression apparatus 410 utilizes the fact that the interference signal components s1 and s2 in the reception signal of the macro-cell base station 20 are included in the reception signal of each of the small-cell base stations 30(1) and 30(2). The interference suppression apparatus 410 refers to the reception signals X1 and X2 of each of the small-cell base station 30(1) and 30(2) via the communication line 50 in the cooperative control network 400, superimposes the interference-cancellation weights $w_1^C$ and $w_2^C$ that are the reception weights, on the reception signals, and uses the reception signals to generate an interference-cancellation signal, which is a signal that becomes an interference signal replica of the macro-cell base station 20. The interference suppression apparatus 410 subtracts the interference-cancellation signal (interference signal replica) from the reception signal X0 of the macro-cell base station 20, thereby suppressing the interference signal at the BBU of the macro-cell base station 20. By the processing of this reception-interference canceller, the interference signal contained in the reception signal of the uplink at the macro-cell base station 20 becomes zero, and the communication quality can be improved to nearly ideal (when no interference arrives).

For example, in the HetNet configuration of FIG. 6, as a result of substituting k=0 into the above-mentioned equation (3), the macro-cell base station (B0) 20 receives the interference signals $$\sum_{i=1}^{N} W_i^{MRC} H_{0i} S_i$$

(from the terminals 10(1) and 10(2) in the other small cells 300(1) and 300(2), and therefore the communication quality is significantly degraded. Therefore, in order to improve the communication quality of the macro-cell base station (B0) 20, the interference suppression apparatus 410 performs the process of the reception-interference canceller. In the reception-interference canceller, the reception weights (complex weights) are superimposed on the reception signals X1 and X2 of the small-cell base station, and the reception signals are subtracted from the reception signal X0 of the uplink of the macro-cell base station (B0) 20, thereby removing the interference signal contained in the reception signals.

Now, if the reception weight (complex weight) superimposed on the reception signal Xk of the k-th small-cell base station 30 (k=1, - - - , N) is denoted by $w_k^C$, and the reception signal when applying the interference canceller of the macro-cell base station (B0) 20 is denoted by $X_0^C$, then the $X_0^C$ can be expressed as in the following equation (5).

$$X_0^C = X_0 + \sum_{k=1}^{N} W_k^c X_k \qquad (5)$$

$$= W_0^{MRC} H_{00} S_0 + \sum_{k=1}^{N} (W_0^{MRC} H_{0k} + W_k^c W_k^{MRC} H_{kk}) S_k$$

$$+ \sum_{k=1}^{N} \sum_{i=1, i \neq k}^{N} W_k^c W_k^{MRC} H_{ki} S_i + W_0^{MRC} N_0 + \sum_{k=1}^{N} W_k^c W_k^{MRC} N_k$$

Herein, the equation (5) is transformed into the following equation (6).

$$X_0^c = \left(W_0^{MRC}H_{00} + \sum_{k=1}^{N} W_k^c W_k^{MRC} H_{k0}\right) S_0 \quad (6)$$

$$+ \sum_{k=1}^{N} \left(W_0^{MRC} H_{0k} S_k + W_k^c W_k^{MRC} \sum_{i=1}^{N} H_{ki} S_i\right)$$

$$+ W_0^{MRC} N_0 + \sum_{k=1}^{N} W_k^c W_k^{MRC} N_k$$

The first term on the right side of the equation (6) represents the reception signal of the small cell terminal Mk, and the second term represents the interference signal from the terminals in the other cells. In order to suppress the interference signal from the other cells in the equation (6), the reception weight (complex weight) $W_i^C$ is determined so as to make the interference signal from the other cells zero, as shown in the following equation (7).

$$\sum_{k=1}^{N} \left(W_0^{MRC} H_{0k} S_k + W_k^c W_k^{MRC} \sum_{i=1}^{N} H_{ki} S_i\right) \equiv 0 \quad (7)$$

When the equation (7) is expressed as a matrix, it becomes the following equation (8).

$$H^{MRC} W^C = -H_0^{MRC} \quad (8)$$

Where, $$H^{MRC} = \begin{bmatrix} W_1^{MRC} H_{11} & \cdots & W_N^{MRC} H_{N1} \\ \vdots & \ddots & \vdots \\ W_1^{MRC} H_{1N} & \cdots & W_N^{MRC} H_{NN} \end{bmatrix}$$

$$W^c = [W_1^c, \ldots, W_N^C]^T$$

$$H_0^{MRC} = [W_0^{MRC} H_{01}, \ldots, W_0^{MRC} H_{0N}]^T$$

From the above equation (8), the reception weight (complex weight) $W^C$ can be obtained by the following equation (9).

$$W^c = -(H^{MRC})^{-1} H_0^{MRC} \quad (9)$$

Herein, by substituting the reception weight of the equation (9) into the equation (6), the reception signal $X_0^C$ is given by the following equation (10).

$$X_0^c = \left(W_0^{MRC} H_{00} + \sum_{k=1}^{N} W_k^c W_k^{MRC} H_{k0}\right) S_0 \quad (10)$$

$$+ W_0^{MRC} N_0 + \sum_{k=1}^{N} W_k^c W_k^{MRC} N_k$$

In the foregoing equation (10), the first term on the right side is the signal of the macro-cell terminal, and the second term is a noise signal, and the interference signal from each of the small cells 300(1) and 300(2) is completely canceled. Furthermore, from the foregoing equation (10), the reception signal at the macro-cell terminal 10(0) is increased by the macro-cell signal included in the reference signal of each of the small cells 300(1) and 300(2).

In this case, the signal power to (interference power and noise power) ratio $SINR_0^C$ of the macro cell terminal can be expressed by the following equation (11).

$$SINR_0^c = \frac{\left|W_0^{MRC} H_{00} + \sum_{k=1}^{N} W_k^c W_k^{MRC} H_{k0}\right|^2}{\left|W_0^{MRC}\right|^2 + \sum_{k=1}^{N} \left|W_k^c W_k^{MRC}\right|^2} \frac{|S_0|^2}{|N|^2} \quad (11)$$

$$= \frac{\left|W_0^{MRC} H_{00} + \sum_{k=1}^{N} W_k^c W_k^{MRC} H_{k0}\right|^2}{1 + \sum_{k=1}^{N} |W_k^c|^2}$$

$$\left(\begin{array}{c} <|N|^2> = <|N|^2> = <|N_1|^2> = \cdots = <|N_N|^2> \\ |W_0^{MRC}|^2 = 1, \; <|S_0|^2> = <1, \; <|N|^2> = 1 \end{array}\right)$$

Where, the ensemble average of the noise power of each base station is equal and is set to $<|N|^2>=1$, and the ensemble average of the signal power of each base station is set to $<|S_k|^2>=1$ (k=0, 1, 2, - - -, N).

The example of FIG. 6 (where the number of small cells is two) utilizes the fact that interference signal components $S_1$ and $S_2$ of the reception signal of the macro-cell base station 20 are included in the reception signal of each of the small-cell base stations 30(1) and 30(2). In the centralized BBU 40 in FIG. 6, the interference suppression apparatus 410 provided in the cooperative control network 400 refers to the reception signals $X_1$ (=$S_1$+$S_2$) and $X_2$ (=$S_2$+$S_1$) of each of the small-cell base stations 30(1) and 30(2), and superimposes the interference-cancellation weights (reception weights) $W_1^C$ and $W_2^C$ on the reference signals $X_1$ and $X_2$ to generate the interference-cancellation signals that are replicas of the interference signals from the small cell terminals 10(1) and 10(2) in the reception signals of the uplink of the macro-cell base station 20. The interference suppression apparatus 410 subtracts the interference-cancellation signal (interference signal replica) from the reception signal X0 of the macro-cell base station 20 to suppress the interference signals from the small cell terminals 10(1) and 10(2) in the uplink of the macro-cell base station 20. By applying this interference suppression technique, the interference signal becomes zero or almost zero at the macro-cell base station 20, and the communication quality can be improved to nearly ideal (when no interference occurs).

The desired signal $S_0$ from the macro-cell terminal 10(0) after the interference suppression process, which is output from the interference suppression apparatus 410, is input to the receiver 420 of the BBU corresponding to the macro-cell base station 20. On the other hand, the reception signals $X_1$ and $X_2$ of each of the small-cell base stations 30(1) and 30(2) are input to the receivers 430(1) and 430(2) of the BBU corresponding to the small-cell base stations 30(1) and 30(2).

It is noted that the cooperative control network 400 in FIG. 6 may further include the interference suppression apparatus that suppresses the interference signals from the terminals of the other cells (other small cells and macro cells) with respect to the reception signals $X_1$ and $X_2$ on the uplink of the small-cell base stations 30(1) and 30(2). In this case, the desired signals $S_1$ and $S_2$ from the small cell terminal 10(1) and 10(2) after the interference suppression process are input to the receivers 430(1) and 430(2) of the BBU corresponding to the small-cell base station 30(1) and 30(2).

[Example of Propagation Path Response Estimation and Reception Weight Calculation]

Herein, when the number of small cells 300 is N, the interference suppression apparatus 410 measures propagation-path responses $h_{ji}$ (i=1 to N, j=1 to N) between the N small cell terminals 10(i) and the antennas 31 of the N small cell base stations 30(j) (between the small cells), and measures propagation-path responses $h_{0i}$ (i=1 to N) between the N small cell terminals 10(i) and the antenna of the macro-cell base station 20 (between the small cells and the macro cell), based on the reception signals X of the macro-cell base station 20 and the plural small-cell base stations 30.

The interference suppression apparatus 410 collects the foregoing propagation-path responses hoi between the small cells and the macro cell to create a first propagation-path response matrix $h_0$ shown in the following equation (12).

$$h_0 = \begin{bmatrix} h_{01} \\ h_{02} \\ h_{03} \\ h_{04} \\ h_{05} \\ h_{06} \\ h_{07} \\ h_{08} \end{bmatrix} \quad (12)$$

Furthermore, the interference suppression apparatus 410 collects the foregoing propagation-path responses $h_{ji}$ between the small cells to create a second propagation-path response matrix H shown in the following equation (13).

$$H = \begin{bmatrix} h_{11} & h_{21} & h_{31} & h_{41} & h_{51} & h_{61} & h_{71} & h_{81} \\ h_{12} & h_{22} & h_{32} & h_{42} & h_{52} & h_{62} & h_{72} & h_{82} \\ h_{13} & h_{23} & h_{33} & h_{43} & h_{53} & h_{63} & h_{73} & h_{83} \\ h_{14} & h_{24} & h_{34} & h_{44} & h_{54} & h_{64} & h_{74} & h_{84} \\ h_{15} & h_{25} & h_{35} & h_{45} & h_{55} & h_{65} & h_{75} & h_{85} \\ h_{16} & h_{26} & h_{36} & h_{46} & h_{56} & h_{66} & h_{76} & h_{86} \\ h_{17} & h_{27} & h_{37} & h_{47} & h_{57} & h_{67} & h_{77} & h_{87} \\ h_{18} & h_{28} & h_{38} & h_{48} & h_{58} & h_{68} & h_{78} & h_{88} \end{bmatrix} \quad (13)$$

Moreover, the interference suppression apparatus 410 creates a matrix $W^c$ (hereinafter also referred to as a "weight matrix") having reception weights $W_i^c$ as elements shown in the following equations (14) and (15), based on the first propagation-path response matrix $h_0$ and the second propagation-path response matrix H. For example, when the number N of the small cells 300 is 8, the weight matrix $W^C$ of the interference-cancellation weights (reception weights) can be generated by solving the inverse matrix of the 8×8 full matrix.

$$W^c = H^{-1} h_0 \quad (14)$$

$$\begin{bmatrix} W_1^C \\ W_2^C \\ W_3^C \\ W_4^C \\ W_5^C \\ W_6^C \\ W_7^C \\ W_8^C \end{bmatrix} = - \begin{bmatrix} h_{11} & h_{21} & h_{31} & h_{41} & h_{51} & h_{61} & h_{71} & h_{81} \\ h_{12} & h_{22} & h_{32} & h_{42} & h_{52} & h_{62} & h_{72} & h_{82} \\ h_{13} & h_{23} & h_{33} & h_{43} & h_{53} & h_{63} & h_{73} & h_{83} \\ h_{14} & h_{24} & h_{34} & h_{44} & h_{54} & h_{64} & h_{74} & h_{84} \\ h_{15} & h_{25} & h_{35} & h_{45} & h_{55} & h_{65} & h_{75} & h_{85} \\ h_{16} & h_{26} & h_{36} & h_{46} & h_{56} & h_{66} & h_{76} & h_{86} \\ h_{17} & h_{27} & h_{37} & h_{47} & h_{57} & h_{67} & h_{77} & h_{87} \\ h_{18} & h_{28} & h_{38} & h_{48} & h_{58} & h_{68} & h_{78} & h_{88} \end{bmatrix}^{-1} \begin{bmatrix} h_{01} \\ h_{02} \\ h_{03} \\ h_{04} \\ h_{05} \\ h_{06} \\ h_{07} \\ h_{08} \end{bmatrix} \quad (15)$$

[Reduction of Amount of Signal Processing for Interference Suppression]

Figure 7:
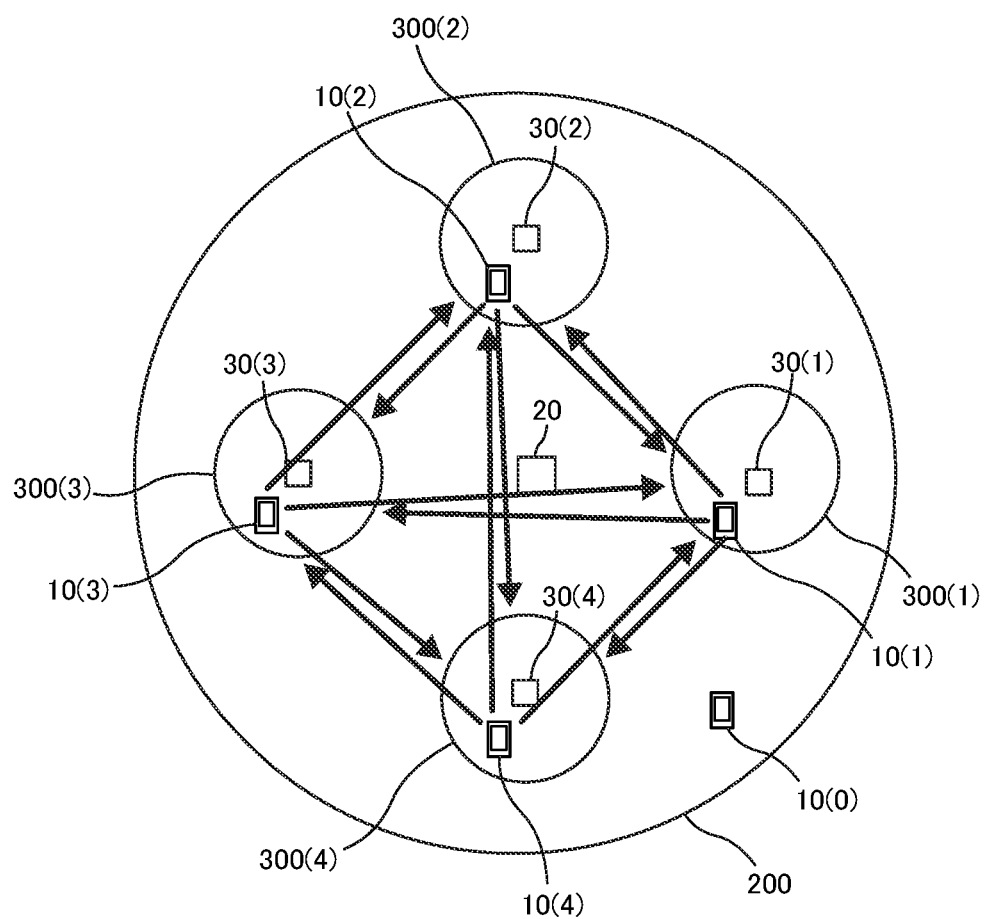
FIG. 7 is a diagram showing an example of signals from other small cell terminals arriving at an antennas of each small-cell base station in the HetNet configuration.

FIG. 7 is a diagram showing an example of signals from the other small-cell terminals arriving at the antennas of each of the small-cell base stations in the HetNet configuration. FIG. 7 shows an example of the HetNet configuration in which four small cells 300(1) to 300(4) are disposed within one macro cell 200. As shown in FIG. 7, each of the uplink transmission signals transmitted from small cell terminals 10(1) to 10(4) located in the plural small cells 300(1) to 300(4) also reaches the antennas of three other small-cell base stations other than the serving small cell, and is received by the other small-cell base stations.

(Calculation Time for Inverse Matrix of Propagation-Path Response Matrix)

In the HetNet configuration in which plural (N) small cells 300(i) are disposed within the macro cell 200 as shown in FIG. 7, it is necessary to solve the inverse matrix $H^{-1}$ of the N×N propagation-path response matrix H in order to generate the weight matrix $W^C$ of interference-cancellation weights (reception weights), and as the number N of the small cells increases, the time of calculation processing for the inverse matrix $H^{-1}$ increases.

(Estimation (Measurement) Time of Propagation-Path Response)

Furthermore, in the HetNet configuration, in order to generate the weight matrix $W^C$ of the interference-cancellation weights (reception weights), it is necessary to obtain the propagation-path response matrix H from each of the small cell terminals to each of the base stations. That is, for each of the small cells, it is necessary to estimate (measure) the propagation-path response $h_{ji}$ between the small cells. Therefore, as the number N of the small cells increases, the amount of signal processing required to estimate (measure) the propagation-path response $h_{ji}$ increases.

In particular, in case that the calculation process of the interference-cancellation weight (reception weight) is performed at every predetermined time interval Δt (for example, 10 msec or 1 msec), if the calculation process of the inverse matrix $H^{-1}$ of the propagation-path response matrix H and the estimation process of the propagation-path response $h_{ji}$ increase, it becomes impossible to calculate the interference-cancellation weights at every predetermined time interval Δt, and impossible to perform the interference canceller operation.

[Signal-Processing Amount Reduction Method 1]

In the first method for reducing the amount of signal processing, it is focused that the signal transmitted from the terminal located in the small cell 300 may not reach the base-station antennas of other small cells with sufficient electric power depending on the distance and propagation path conditions between the small cells 300, and the propagation path through which a signal from the terminal does not arrive with sufficient electric power is excluded from an interference-canceller processing in the interference suppression apparatus.

Figure 8A:
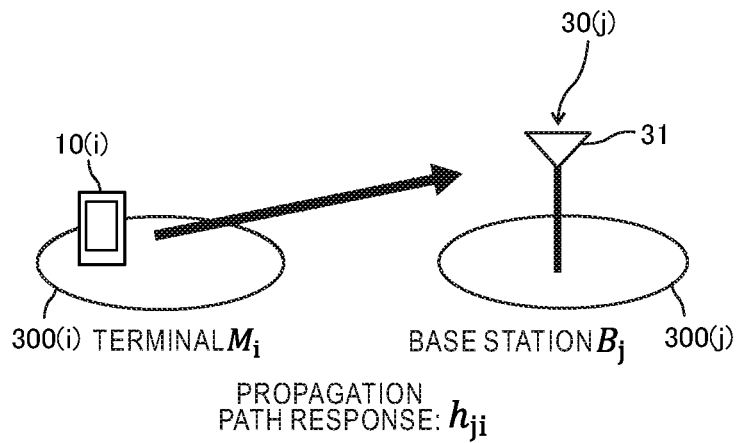
FIG. 8A is a diagram showing an example of transmission and reception of a signal from a terminal to an antenna of a small-cell base station when small cells are close to each other in a first method of reducing an amount of signal processing.

For example, in a situation where there is a large interference between the small cells, such as a case that the distance between small cells 300(i) and 300(j) is close as shown in FIG. 8A, since it is necessary to cancel the interference, for the propagation-path response $h_{ji}$ corresponding to the inter-small cells in the propagation-path response matrix that is used to calculate the interference-cancellation weight, the value at the time of estimation (at the time of measurement) is used as it is.

Figure 8B:
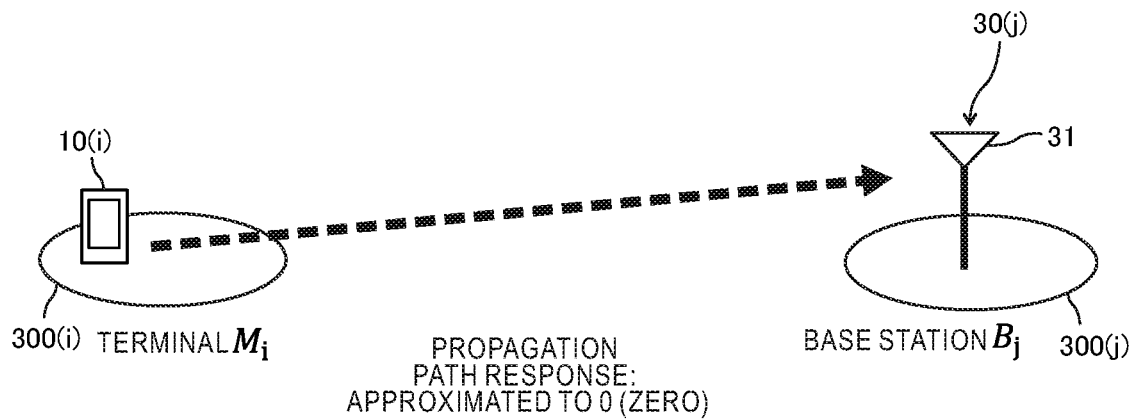
FIG. 8B is a diagram showing an example of transmission and reception of a signal from a terminal to an antenna of a small-cell base station when small cells are far apart in a first method of reducing an amount of signal-processing.

On the other hand, in a situation where the interference between small cells is small, such as a case that the distance between the small cells $300(i)$ and $300(j)$ is large as shown in FIG. 8B, since it is not necessary to cancel the interference, the propagation-path response $h_{ji}$ corresponding to the inter-small cells in the propagation-path response matrix that is used to calculate the interference-cancellation weight is approximated to 0 (zero).

In a specific example of the first method of reducing the amount of signal-processing, a predetermined first threshold value $\gamma_{th}$ for reception electric power is set, and when an electric power of the propagation-path response $h_{ji}$ is smaller than the first threshold value $\gamma_{th}$ or equal to or less than the first threshold value $\gamma_{th}$, the $h_{ji}$ is approximated to 0.

FIGS. 9A to 9C are diagrams respectively showing a specific example of approximation of the propagation-path response $h_{ji}$ when the first thresholds $\gamma_{th}$ different from each other are set in the first method of reducing an amount of signal processing. It is noted that, although each of FIGS. 9A to 9C is an example in which the number of small cells 300 is four, the number of the small cells 300 may be two, three, five or more.

In the example of FIG. 9A, the first threshold value $\gamma_{th}=0$ [dB] is set, and it is determined that the signals from the terminals 10(2), 10(3) and 10(4) located in the second, the third and the fourth small cells 300(2), 300(3) and 300(4) arrive and interfere at the antenna of the first small-cell base station 30(1). Therefore, the propagation-path responses $h_{12}$, $h_{13}$ and $h_{14}$ are not approximated to 0 (zero).

In the example of FIG. 9B, the first threshold value $\gamma_{th}=10$ [dB] is set, and it is determined that no signal arrives at the antenna of the first small-cell base station 30(1) from the terminal 10(3) located in the third small cell 300(3). That is, since it is determined to be $|h_{13}|^2 < \gamma_{th}$, the propagation-path response is approximated to $h_{13}=0$ (zero). On the other hand, since the signals from the terminals 10(2) and 10(4) located in the second and the fourth small cells 300(2) and 300(4) arrive and interfere at the antenna of the first small-cell base station 30(1), the propagation-path responses $h_{12}$ and $h_{14}$ are not approximated to 0 (zero).

In the example of FIG. 9C, the first threshold value $\gamma_{th}=20$ [dB] is set, and it is determined that no signal arrives at the antenna of the first small-cell base station 30(1) from the terminals 10(3) and 10(40) located in the third and the fourth small cells 300(3) and 300(4). That is, since it is determined to be $|h_{13}|^2 < \gamma^{th}$ and $|h_{14}|^2 < \gamma_{th}$, the propagation-path responses are approximated to $h_{13}=0$ (zero) and $h_{14}=0$ (zero). On the other hand, since the signal from the terminal 10(2) located in the second small cell 300(2) arrives and interfere at the antenna of the first small-cell base station 30(1), the propagation-path response $h_{12}$ is not approximated to 0 (zero).

In the first method of reducing the amount of signal processing of the present disclosure, in case that the small cells $300(i)$ (i=1 to 8) with the numbers of 1 to 8 are disposed within the macro cell and the small cells with the numbers next to each other are located relatively close to each other, the propagation-path response matrix H of the propagation-path responses $h_{ji}$ between the small cells, for which the inverse matrix is calculated as shown in the following equation (16), approaches a sparse matrix having non-zero elements only on the main diagonal and the diagonals adjacent above and below the main diagonal.

$$\begin{bmatrix} w_1^C \\ w_2^C \\ w_3^C \\ w_4^C \\ w_5^C \\ w_6^C \\ w_7^C \\ w_8^C \end{bmatrix} = - \begin{bmatrix} h_{11} & h_{21} & h_{31} & h_{41} & h_{51} & h_{61} & h_{71} & h_{81} \\ h_{12} & h_{22} & h_{32} & h_{42} & h_{52} & h_{62} & h_{72} & h_{82} \\ h_{13} & h_{23} & h_{33} & h_{43} & h_{53} & h_{63} & h_{73} & h_{83} \\ h_{14} & h_{24} & h_{34} & h_{44} & h_{54} & h_{64} & h_{74} & h_{84} \\ h_{15} & h_{25} & h_{35} & h_{45} & h_{55} & h_{65} & h_{75} & h_{85} \\ h_{16} & h_{26} & h_{36} & h_{46} & h_{56} & h_{66} & h_{76} & h_{86} \\ h_{17} & h_{27} & h_{37} & h_{47} & h_{57} & h_{67} & h_{77} & h_{87} \\ h_{18} & h_{28} & h_{38} & h_{48} & h_{58} & h_{68} & h_{78} & h_{88} \end{bmatrix}^{-1} \begin{bmatrix} h_{01} \\ h_{02} \\ h_{03} \\ h_{04} \\ h_{05} \\ h_{06} \\ h_{07} \\ h_{08} \end{bmatrix} = - \quad (16)$$

$$\begin{bmatrix} h_{11} & h_{21} & 0 & 0 & 0 & 0 & 0 & 0 \\ h_{12} & h_{22} & h_{32} & 0 & 0 & 0 & 0 & 0 \\ 0 & h_{23} & h_{33} & h_{43} & 0 & 0 & 0 & 0 \\ 0 & 0 & h_{34} & h_{44} & h_{54} & 0 & 0 & 0 \\ 0 & 0 & 0 & h_{45} & h_{55} & h_{65} & 0 & 0 \\ 0 & 0 & 0 & 0 & h_{56} & h_{66} & h_{76} & 0 \\ 0 & 0 & 0 & 0 & 0 & h_{67} & h_{77} & h_{87} \\ 0 & 0 & 0 & 0 & 0 & 0 & h_{78} & h_{88} \end{bmatrix}^{-1} \begin{bmatrix} h_{01} \\ h_{02} \\ h_{03} \\ h_{04} \\ h_{05} \\ h_{06} \\ h_{07} \\ h_{08} \end{bmatrix}$$

In case that the first threshold value $\gamma_{th}$ is small, as shown in the propagation-path response matrix H of the following equation (17), there are few propagation-path responses that satisfy $|h_{ji}|^2 < \gamma_{th}$ and few propagation-path responses that can be approximated as $h_{ji}=0$.

$$H = \begin{bmatrix} h_{11} & h_{21} & 0 & 0 & 0 & h_{61} & h_{71} & h_{81} \\ h_{12} & h_{22} & h_{32} & 0 & 0 & 0 & h_{72} & h_{82} \\ h_{13} & h_{23} & h_{33} & h_{43} & 0 & 0 & 0 & h_{83} \\ h_{14} & h_{24} & h_{34} & h_{44} & h_{54} & 0 & 0 & 0 \\ 0 & h_{25} & h_{35} & h_{45} & h_{55} & h_{65} & 0 & 0 \\ 0 & 0 & h_{36} & h_{46} & h_{56} & h_{66} & h_{76} & 0 \\ 0 & 0 & 0 & h_{47} & h_{57} & h_{67} & h_{77} & h_{87} \\ h_{18} & 0 & 0 & 0 & h_{58} & h_{68} & h_{78} & h_{88} \end{bmatrix} \quad (17)$$

As the first threshold value $\gamma_{th}$ is increased, as shown in the propagation-path response matrix H of the following equation (18), the propagation-path responses satisfying $|h_{ji}|^2 < \gamma_{th}$ increase, the propagation-path responses that can be approximated by $h_{ji}=0$ increase, and the propagation-path response matrix H becomes a tridiagonal matrix that is a sparse matrix.

$$H = \begin{bmatrix} h_{11} & h_{21} & 0 & 0 & 0 & 0 & 0 & 0 \\ h_{12} & h_{22} & h_{32} & 0 & 0 & 0 & 0 & 0 \\ 0 & h_{23} & h_{33} & h_{43} & 0 & 0 & 0 & 0 \\ 0 & 0 & h_{34} & h_{44} & h_{54} & 0 & 0 & 0 \\ 0 & 0 & 0 & h_{45} & h_{55} & h_{65} & 0 & 0 \\ 0 & 0 & 0 & 0 & h_{56} & h_{66} & h_{76} & 0 \\ 0 & 0 & 0 & 0 & 0 & h_{67} & h_{77} & h_{87} \\ 0 & 0 & 0 & 0 & 0 & 0 & h_{78} & h_{88} \end{bmatrix} \quad (18)$$

As the first threshold value $\gamma_{th}$ is further increased, as shown in the propagation-path response matrix H of the following equation (19), the propagation-path responses satisfying $|h_{ji}|^2 < \gamma_{th}$ increase, the propagation-path responses that can be approximated by $h_{ji}=0$ increase, and the propagation-path response matrix H becomes a diagonal matrix that is a sparse matrix with even more zero elements. In case that the propagation-path response matrix H is a diagonal matrix, the amount of calculation required for the inverse matrix of the propagation-path response matrix H can be significantly reduced as shown in the following equation (20).

$$H = \begin{bmatrix} h_{11} & 0 & 0 & 0 & 0 & 0 & 0 & 0 \\ 0 & h_{22} & 0 & 0 & 0 & 0 & 0 & 0 \\ 0 & 0 & h_{33} & 0 & 0 & 0 & 0 & 0 \\ 0 & 0 & 0 & h_{44} & 0 & 0 & 0 & 0 \\ 0 & 0 & 0 & 0 & h_{55} & 0 & 0 & 0 \\ 0 & 0 & 0 & 0 & 0 & h_{66} & 0 & 0 \\ 0 & 0 & 0 & 0 & 0 & 0 & h_{77} & 0 \\ 0 & 0 & 0 & 0 & 0 & 0 & 0 & h_{88} \end{bmatrix} \quad (19)$$

$$H^{-1} = \begin{bmatrix} 1/h_{11} & 0 & 0 & 0 & 0 & 0 & 0 & 0 \\ 0 & 1/h_{22} & 0 & 0 & 0 & 0 & 0 & 0 \\ 0 & 0 & 1/h_{33} & 0 & 0 & 0 & 0 & 0 \\ 0 & 0 & 0 & 1/h_{44} & 0 & 0 & 0 & 0 \\ 0 & 0 & 0 & 0 & 1/h_{55} & 0 & 0 & 0 \\ 0 & 0 & 0 & 0 & 0 & 1/h_{66} & 0 & 0 \\ 0 & 0 & 0 & 0 & 0 & 0 & 1/h_{77} & 0 \\ 0 & 0 & 0 & 0 & 0 & 0 & 0 & 1/h_{88} \end{bmatrix} \quad (20)$$

Figure 10:
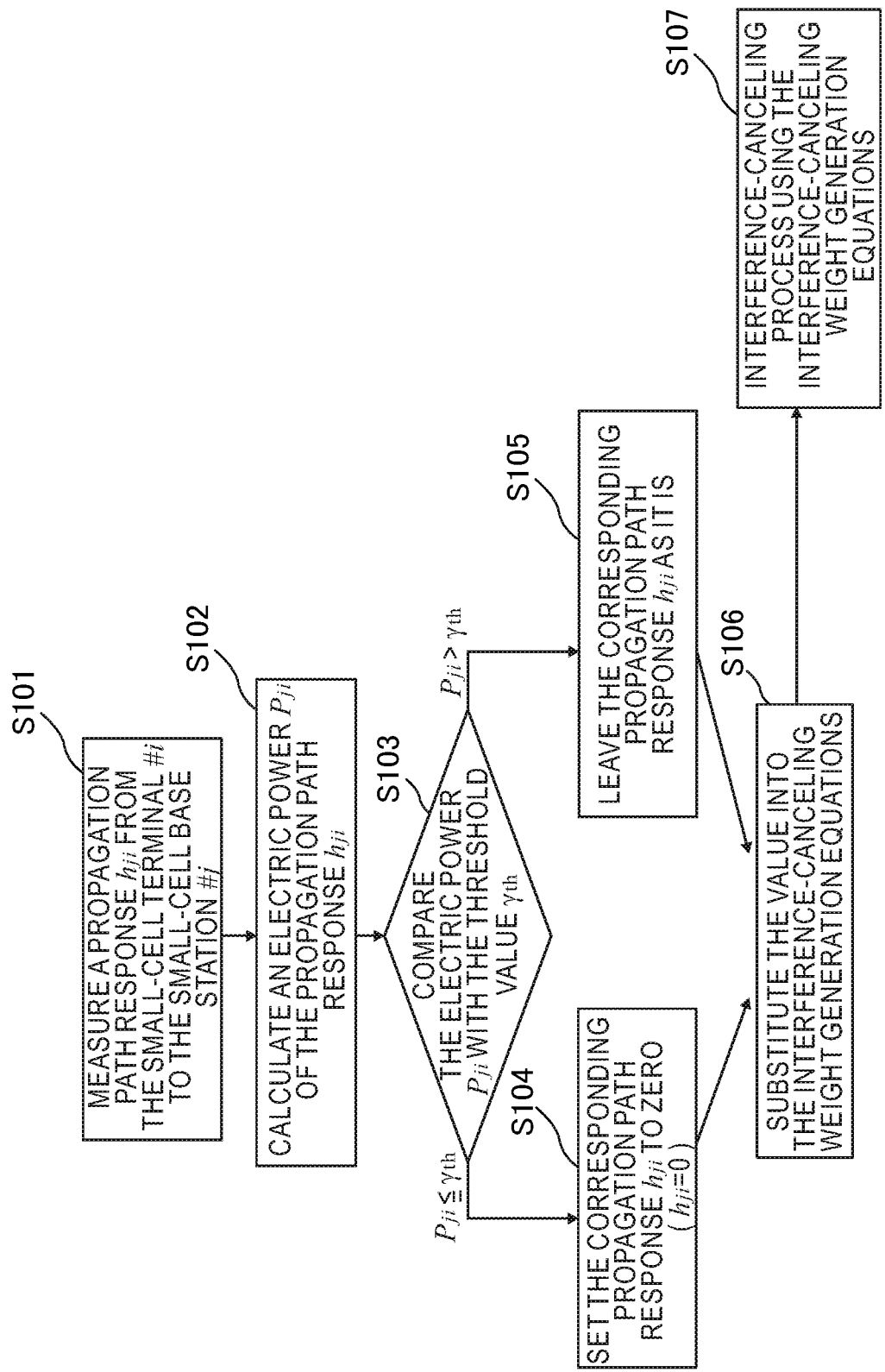
FIG. 10 is a flowchart showing an example of an update process of an interference-cancellation weight in the interference suppression apparatus of the system according to the embodiment.

FIG. 10 is a flowchart showing an example of an update process of an interference-cancellation weight in the interference suppression apparatus 410 of the system according to the embodiment. The update process of the interference-cancellation weight in FIG. 10 is performed every predetermined time interval $\Delta t$. The time interval $\Delta t$ may be changed depending on conditions such as the moving velocity of the terminal.

In FIG. 10, the interference suppression apparatus 410 measures (estimates), for plural small cells deployed within the macro cell 200, a propagation-path response $h_{ji}$ from the small-cell terminal #i to the small-cell base station #j, based on the reception signal (reference signal) of the small-cell base station #j that has received a channel-estimation pilot signal (for example, DMRS) from the small cell terminal #i (S101), and calculates an electric power $P_{ji}$ of the propagation-path response $h_{ji}$ (S102).

Next, for the plural small cells, the interference suppression apparatus 410 compares the calculated electric power $P_{ji}$ of the propagation-path response $h_{ji}$ with the first threshold value $\gamma_{th}$ (S103), approximates the corresponding propagation-path response $h_{ji}$ to zero ($h_{ji}$=0) if $P_{ji} \leq \gamma_{th}$ (S104), and leaves the corresponding propagation-path response $h_{ji}$ as it is if $P_{ji} > \gamma_{th}$ (S105).

Next, the interference suppression apparatus 410 updates the value of propagation-path response $h_{ji}$ determined in the foregoing steps S103 to S105 by substituting it into the above-mentioned generation equation for interference-cancellation weights (see, for example, the foregoing equations (14) and (15)) (S106). The interference suppression apparatus 410 performs a cancellation process for macro-cell uplink reception interference using the weight W generated by the updated generation equation for interference-cancellation weights (S107). For example, the interference suppression apparatus 410 generates a replica signal for removing an interference signal from each of the small cells, based on the weight W generated using the updated generation equation for interference-cancellation weights, the reception signal of the macro-cell base station 20 and the reception signals of the plural small-cell base stations 30, and subtracts the replica signal from the reception signal of the macro-cell base station 20.

According to the first method of reducing the amount of signal-processing of the present disclosure, since the propagation-path response matrix between the small cells, which is included in the generation equation for interference-cancellation weights for generating the weight W, can be approximated to the sparse matrix (matrix with many zero elements) as shown in the above equations (18) and (19), depending on the electric power $P_{ji}$ of the propagation-path response $h_{ji}$ between the small cells, the amount of calculation for obtaining the inverse matrix of the propagation-path response matrix can be reduced compared to the case of using the full matrix before approximation.

[Signal-Processing Amount Reduction Method 2]

In the second method for reducing the amount of signal processing, it is focused that the signal transmitted from the terminal located in the small cell 300 may not reach the base-station antennas of other small cells with sufficient electric power depending on the distance and propagation path conditions between the small cells 300, and determines in advance a combination of small cells for estimating (measuring) the propagation-path response so that estimation (measurement) of the propagation path-response is not performed for the propagation path where the signal from the terminal 10 does not arrive with sufficient electric power.

Figure 11A:
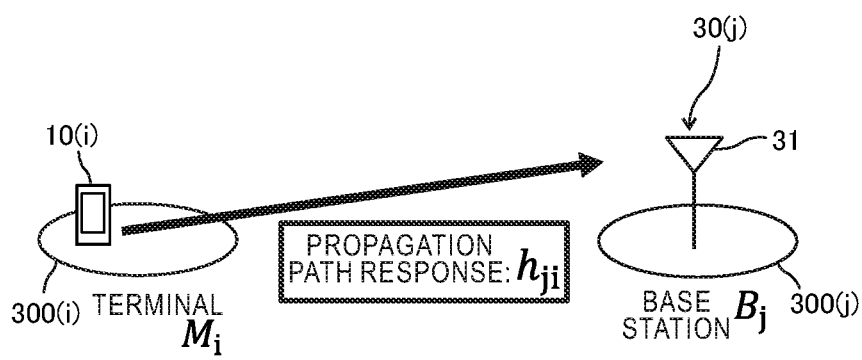
FIG. 11A is a diagram showing an example of transmission and reception of a signal from a terminal to an antenna of a small-cell base station when small cells are close to each other in a second method of reducing an amount of signal-processing.

For example, in a case between the small cells where the signal arrives from the small cell terminal at the predetermined electric power such that the small cells 300(i) and 300(j) are close to each other as shown in FIG. 11A, since the propagation path between the small cells cannot be ignored, the propagation-path response $h_{ji}$ is estimated (measured) one by one.

Figure 11B:
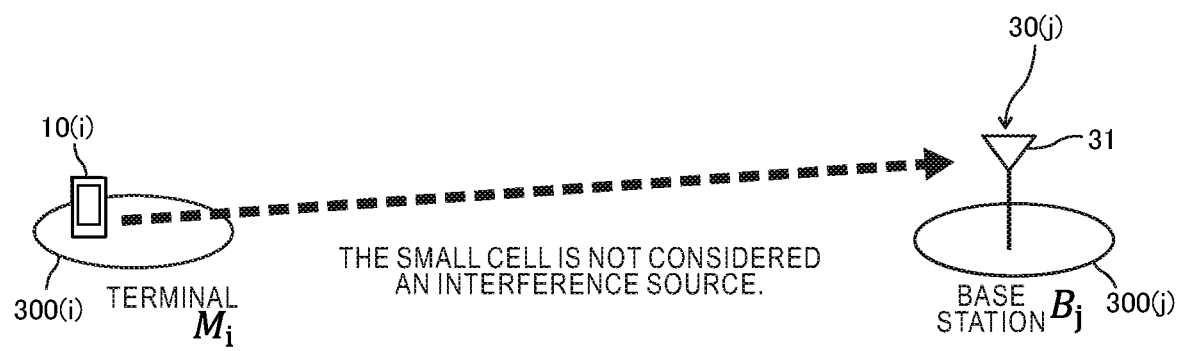
FIG. 11B is a diagram showing an example of transmission and reception of a signal from a terminal to an antenna of a small-cell base station when small cells are far apart in a second method of reducing an amount of signal-processing.

On the other hand, in a case between the small cells where the signal from the small cell terminal has difficulty reaching the small cells at the predetermined electric power such that the distance between small cells 300(i) and 300(j) is large as shown in FIG. 11B, the propagation-path response $h_{ji}$ between the small cells is not estimated (measured) and the propagation-path response $h_{ji}$ is set to 0 (zero) in advance.

FIGS. 12A to 12D are diagrams showing specific examples of presetting propagation-path responses $h_{ji}$ when the second threshold values $\Gamma_{th}$ different from each other are set in the second method of reducing an amount of signal-processing. It is noted that, although FIGS. 12A to 12D show examples in which the number of the small cells 300 is four, the number of small cells 300 may be two, three, five or more.

Figure 12A:
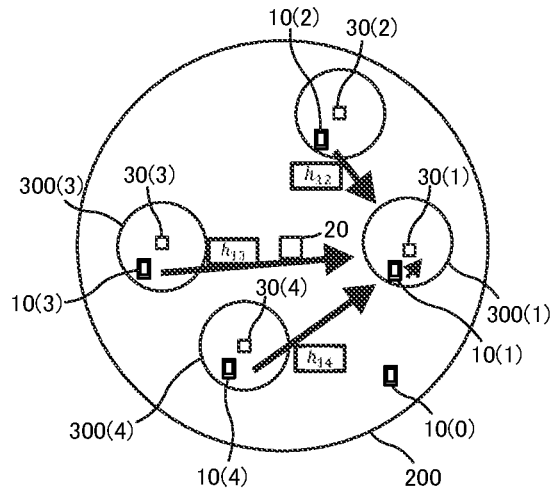
FIG. 12A is a diagram showing a specific example of the second method of reducing an amount of signal-processing.

When designing the cells in FIG. 12A, the propagation-path responses $h_{ji}$ between the small cells are respectively estimated (measured) in advance based on the reception signal of each of the small-cell base station, and if the estimated result of the propagation-path response $h_{ji}$ is less than the predetermined second threshold value $\Gamma_{th}$ or is equal to or less than the second threshold value $\Gamma_{th}$, the propagation-path response $h_{ji}$ is preset to 0 (zero), and the propagation-path response $h_{ji}$ of the propagation path is not estimated (measured) in the interference-cancellation process after starting the operation.

Figure 12B:
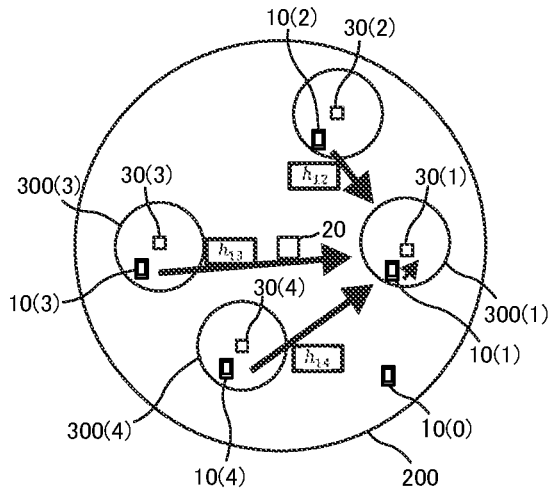
FIG. 12B is a diagram showing a specific example of the second method of reducing an amount of signal-processing.

In the example of FIG. 12B, the second threshold value of $\Gamma_{th}$=0 [dB] is set, and the values of $h_{11}$, $h_{12}$, $h_{13}$ and $h_{14}$ estimated (measured) in advance at the time of cell design for the small cells 300(1) to 300(4) are all equal to or greater than the second threshold value $\Gamma_{th}$. Therefore, when starting an operation, an estimation (measurement) is performed on the propagation-path responses $h_{11}$, $h_{12}$, $h_{13}$ and $h_{14}$ between the antenna of the first small-cell base station 30(1) and the terminals 10(1) to 10(4) located in all of the small cells 300(1) to 300(4).

Figure 12C:
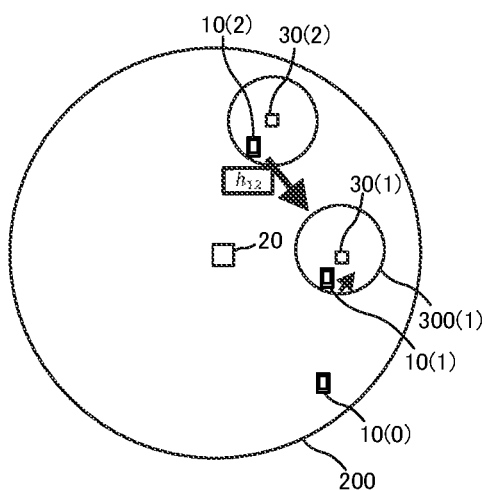
FIG. 12C is a diagram showing a specific example of the second method of reducing an amount of signal-processing.

In the example of FIG. 12C, the second threshold value of $\Gamma_{th}$=10 [dB] is set, and the values of $h_{11}$ and $h_{12}$ estimated (measured) in advance at the time of cell design only for the two small cells 300(1) and 300(2) are equal to or greater than the second threshold value $\Gamma_{th}$. Therefore, when starting an operation, an estimation (measurement) is performed only on the propagation-path responses $h_{11}$ and $h_{12}$ between the antenna of the first small-cell base station 30(1) and the terminals 10(1) and 10(2) located in the small cells 300(1) and 300(2).

Figure 12D:
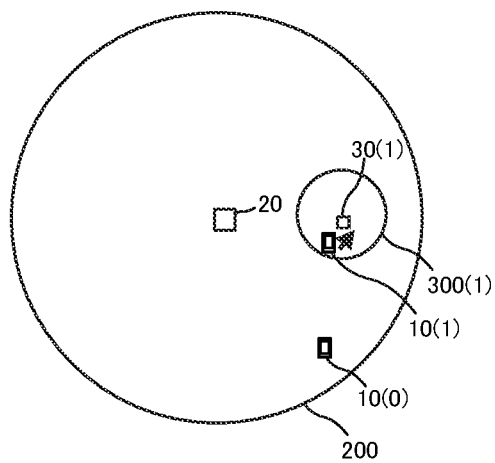
FIG. 12D is a diagram showing a specific example of the second method of reducing an amount of signal-processing.

In the example of FIG. 12D, the second threshold value of $\Gamma_{th}$=20 [dB] is set, and the value of $h_{11}$ estimated (measured) in advance at the time of cell design only for the one small cell 300(1) is equal to or greater than the second threshold value $\Gamma_{th}$. Therefore, when starting an operation, an estimation (measurement) is performed only on the propagation-path response $h_{11}$ between the antenna of the first small-cell base station 30(1) and the terminal located in the own small cell.

In the second method of reducing an amount of signal-processing of the present disclosure, when small the cells 300(i) (i=1 to 8) with the numbers of 1 to 8 are disposed within the macro cell and the second threshold value $\Gamma_{th}$ is small, it is possible to reduce the estimation (measurement) process of 25 propagation-path responses among the propagation-path responses with 64 elements, as shown in the propagation-path response matrix H of the following equation (21). That is, it is possible to reduce approximately 40% of the estimation (measurement) process of the propagation-path response.

$$H = \begin{bmatrix} h_{11} & h_{21} & 0 & 0 & 0 & h_{61} & h_{71} & h_{81} \\ h_{12} & h_{22} & h_{32} & 0 & 0 & 0 & h_{72} & h_{82} \\ h_{13} & h_{23} & h_{33} & h_{43} & 0 & 0 & 0 & h_{83} \\ h_{14} & h_{24} & h_{34} & h_{44} & h_{54} & 0 & 0 & 0 \\ 0 & h_{25} & h_{35} & h_{45} & h_{55} & h_{65} & 0 & 0 \\ 0 & 0 & h_{36} & h_{46} & h_{56} & h_{66} & h_{76} & 0 \\ 0 & 0 & 0 & h_{47} & h_{57} & h_{67} & h_{77} & h_{87} \\ 0 & 0 & 0 & 0 & h_{58} & h_{68} & h_{78} & h_{88} \end{bmatrix} \quad (21)$$

When the second threshold value $\Gamma_{th}$ is increased, it is possible to reduce the estimation (measurement) process of 42 propagation-path responses among the propagation-path responses with 64 elements, as shown in the propagation-path response matrix H of the following equation (22). That is, it is possible to reduce approximately 65% of the estimation (measurement) process of the propagation-path response.

$$H = \begin{bmatrix} h_{11} & h_{21} & 0 & 0 & 0 & 0 & 0 & 0 \\ h_{12} & h_{22} & h_{32} & 0 & 0 & 0 & 0 & 0 \\ 0 & h_{23} & h_{33} & h_{43} & 0 & 0 & 0 & 0 \\ 0 & 0 & h_{34} & h_{44} & h_{54} & 0 & 0 & 0 \\ 0 & 0 & 0 & h_{45} & h_{55} & h_{65} & 0 & 0 \\ 0 & 0 & 0 & 0 & h_{56} & h_{66} & h_{76} & 0 \\ 0 & 0 & 0 & 0 & 0 & h_{67} & h_{77} & h_{87} \\ 0 & 0 & 0 & 0 & 0 & 0 & h_{78} & h_{88} \end{bmatrix} \quad (22)$$

When the second threshold value $\Gamma_{th}$ is further increased, it is possible to reduce the estimation (measurement) process of 56 propagation-path responses among the propagation-path responses with 64 elements, as shown in the propagation-path response matrix H of the following equation (23). That is, it is possible to reduce approximately 85% of the estimation (measurement) process of the propagation-path response.

$$H = \begin{bmatrix} h_{11} & 0 & 0 & 0 & 0 & 0 & 0 & 0 \\ 0 & h_{22} & 0 & 0 & 0 & 0 & 0 & 0 \\ 0 & 0 & h_{33} & 0 & 0 & 0 & 0 & 0 \\ 0 & 0 & 0 & h_{44} & 0 & 0 & 0 & 0 \\ 0 & 0 & 0 & 0 & h_{55} & 0 & 0 & 0 \\ 0 & 0 & 0 & 0 & 0 & h_{66} & 0 & 0 \\ 0 & 0 & 0 & 0 & 0 & 0 & h_{77} & 0 \\ 0 & 0 & 0 & 0 & 0 & 0 & 0 & h_{88} \end{bmatrix} \quad (23)$$

Figure 13:
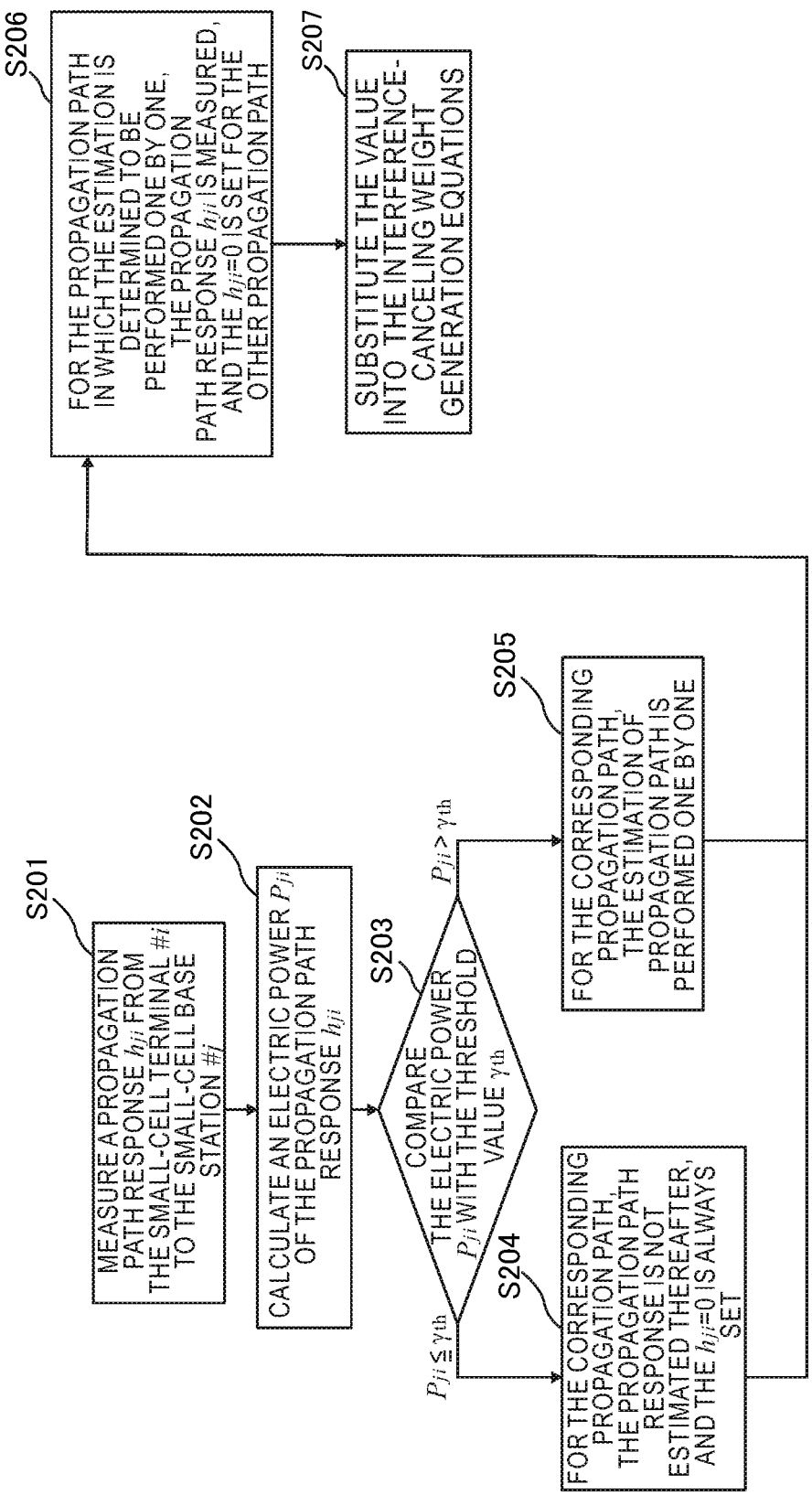
FIG. 13 is a flowchart showing another example of the update process of the interference-cancellation weight in the interference suppression apparatus of the system according to the embodiment.

FIG. 13 is a flowchart showing another example of the update process of the interference-cancellation weight in the interference suppression apparatus 410 of the system according to the embodiment. In FIG. 13, before starting an operation, the interference suppression apparatus 410 determines the propagation paths for which the propagation-path responses are to be measured (estimated) with respect to the plural small cells disposed within the macro cell 200.

First, for the plural small cells disposed within the macro cell 200, the interference suppression apparatus 410 measures (estimates) a propagation-path response $h_{ji}$ from the small cell terminal #i to the small-cell base station #j, based on the reception signal (reference signal) of the small-cell base station #j that has received a pilot signal for channel estimation (for example, DMRS) from the small cell terminal #i (S201), and calculates an electric power $P_{ji}$ of the propagation-path response $h_{ji}$ (S202).

Next, for the plural small cells, the interference suppression apparatus 410 compares the calculated value of electric power $P_{ji}$ of the propagation-path response $h_{ji}$ with the second threshold value $\Gamma_{th}$ (S203), and if $P_{ji} \geq \Gamma_{th}$, does not include the corresponding propagation path in the estimation (measurement) process of the propagation-path response $h_{ji}$, and constantly sets the corresponding propagation-path response $h_{ji}$ to zero ($h_{ji}$=0) (S204). On the other hand, if $P_{ji} > \Gamma_{th}$, the interference suppression apparatus 410 sets the corresponding propagation path to a target of the estimation (measurement) process for estimating (measuring) the propagation-path response $h_{ji}$ one by one (S205).

Next, at every predetermined time interval $\Delta t$, the interference suppression apparatus 410 estimates (measures) the propagation-path response $h_{ji}$ for the propagation path that is set as the target of the estimation (measurement) process of the propagation-path response $h_{ji}$, based on the reception signal (reference signal) of the small-cell base station #j that has received a pilot signal for channel estimation (for example, DMRS) from the small cell terminal #i, and performs an update process of the interference-cancellation weight (S206). For propagation paths that are not set as the target of the estimation (measurement) process of the propagation-path response $h_{ji}$, the propagation-path response $h_{ji}$ is not estimated (measured) and the $h_{ji}$ is set to 0 (S206). It is noted that, the time interval $\Delta t$ may be changed depending on conditions such as the moving velocity of the terminal.

The interference suppressing apparatus 410 updates the value of propagation-path response $h_{ji}$ determined in the foregoing S206 by substituting it into the above-mentioned generation equation for interference-cancellation weights (see, for example, the foregoing equations (14) and (15)) (S207). The interference suppression apparatus 410 performs a cancellation process for macro-cell uplink reception interference using the weight W generated by the updated generation equation for interference-cancellation weights. For example, the interference suppression apparatus 410 generates a replica signal for removing an interference signal from each of the small cells, based on the weight W generated using the updated generation equation for interference-cancellation weights, the reception signal of the macro-cell base station 20 and the reception signals of the plural small-cell base stations 30, and subtracts the replica signal from the reception signal of the macro-cell base station 20.

According to the second method of reducing the amount of signal-processing of the present disclosure, with respect to the plural small cells disposed within the macro cell 200, a propagation path, for which the estimation (measurement) of propagation-path response is not performed after starting the operation, is determined depending on the electric power $P_{ji}$ of the propagation-path response $h_{ji}$ between the small cells measured in advance before starting an operation, and the propagation-path response $h_{ji}$ of the determined propagation path is constantly set to zero ($h_{ji}=0$). For this preset propagation path that is constantly zero ($h_{ji}=0$), it is not necessary to estimate the propagation-path response based on the measurement results of the reception signal of the pilot signal one by one; therefore, the amount of signal processing required for estimating (measuring) the propagation-path response can be reduced.

In particular, the more propagation-path responses $h_{ji}$ that are constantly preset to zero ($h_{ji}=0$), the total number of propagation-path responses to be estimated (measured) is reduced, and the amount of signal processing for propagation path estimation in the entire HetNet configuration can be reduced.

[Combination of Signal-Processing Amount Reduction Methods 1 and 2]

In the system of the present embodiment, the foregoing first method of reducing the amount of signal-processing and the foregoing second method of reducing the amount of signal-processing may be performed in combination. In this case, a synergistic effect of both can be obtained.

First, by using the above-mentioned signal-processing amount reduction method 2, when designing the cells, a combination of small cells for estimating (measuring) the propagation-path response is determined in advance based on the foregoing second threshold value Γ'th so that an estimation (measurement) of the propagation-path response is not performed for propagation paths where the signal from the small cell terminal 10 does not arrive with sufficient electric power.

For example, in case that the number of small cells is eight, among the 64 elements of the propagation-path response matrix H consisting of a full matrix shown in the following equation (24), with respect to elements corresponding to the reception electric power of the pilot signal from the small cell terminal, each of which is measured when designing the cells and is equal to or less than the second threshold value Γth, the propagation-path response $h_{ji}$ of the corresponding element is set to zero ($h_{ji}=0$) as shown in the following equation (25), and an estimation (measurement) process of the propagation-path response is not performed after starting the operation.

$$H = \begin{bmatrix} h_{11} & h_{21} & h_{31} & h_{41} & h_{51} & h_{61} & h_{71} & h_{81} \\ h_{12} & h_{22} & h_{32} & h_{42} & h_{52} & h_{62} & h_{72} & h_{82} \\ h_{13} & h_{23} & h_{33} & h_{43} & h_{53} & h_{63} & h_{73} & h_{83} \\ h_{14} & h_{24} & h_{34} & h_{44} & h_{54} & h_{64} & h_{74} & h_{84} \\ h_{15} & h_{25} & h_{35} & h_{45} & h_{55} & h_{65} & h_{75} & h_{85} \\ h_{16} & h_{26} & h_{36} & h_{46} & h_{56} & h_{66} & h_{76} & h_{86} \\ h_{17} & h_{27} & h_{37} & h_{47} & h_{57} & h_{67} & h_{77} & h_{87} \\ h_{18} & h_{28} & h_{38} & h_{48} & h_{58} & h_{68} & h_{78} & h_{88} \end{bmatrix} \quad (24)$$

$$H = \begin{bmatrix} h_{11} & h_{21} & 0 & 0 & 0 & 0 & 0 & 0 \\ h_{12} & h_{22} & h_{32} & 0 & 0 & 0 & 0 & 0 \\ h_{13} & h_{23} & h_{33} & h_{43} & 0 & 0 & 0 & 0 \\ h_{14} & h_{24} & h_{34} & h_{44} & h_{54} & 0 & 0 & 0 \\ 0 & h_{25} & h_{35} & h_{45} & h_{55} & h_{65} & 0 & 0 \\ 0 & 0 & h_{36} & h_{46} & h_{56} & h_{66} & h_{76} & 0 \\ 0 & 0 & 0 & h_{47} & h_{57} & h_{67} & h_{77} & h_{87} \\ 0 & 0 & 0 & 0 & h_{58} & h_{68} & h_{78} & h_{88} \end{bmatrix} \quad (25)$$

Next, after starting the operation, the reception electric power P from the small cell terminal is measured for the propagation paths of the small cells corresponding to the combination determined by the above-mentioned signal-processing amount reduction method 2, and if the reception electric power P is smaller than the predetermined first threshold value $\gamma_{th}$, the above-mentioned signal-processing a mount reduction method 1 is performed to approximate the corresponding propagation-path response to zero (0).

For example, at every predetermined time interval Δt after starting the operation, the estimation (measurement) process of the propagation-path response $h_{ji}$ is performed for 33 elements other than zero (0) in the propagation-path response matrix of the foregoing equation (25), and with respect to elements corresponding to the propagation-path response $h_{ji}$, in which each electric power $P_{ji}$ thereof is equal to or less than the first threshold value $\gamma_{th}$, the propagation-path response $h_{ji}$ of the corresponding element is approximated to zero ($h_{ji}=0$) as shown in the following equation (26).

$$H = \begin{bmatrix} h_{11} & 0 & 0 & 0 & 0 & 0 & 0 & 0 \\ h_{12} & h_{22} & 0 & 0 & 0 & 0 & 0 & 0 \\ h_{13} & h_{23} & h_{33} & 0 & 0 & 0 & 0 & 0 \\ 0 & 0 & 0 & h_{44} & 0 & 0 & 0 & 0 \\ 0 & 0 & h_{35} & h_{45} & h_{55} & 0 & 0 & 0 \\ 0 & 0 & 0 & h_{46} & h_{56} & h_{66} & 0 & 0 \\ 0 & 0 & 0 & 0 & h_{57} & h_{67} & h_{77} & 0 \\ 0 & 0 & 0 & 0 & 0 & 0 & h_{78} & h_{88} \end{bmatrix} \quad (26)$$

In this way, by combining the first method of reducing an amount of signal processing and the second method of reducing an amount of signal processing described above, it is possible to reduce the amount of signal processing for estimating (measuring) the propagation-path response and the amount of calculation for generating the interference-cancellation weights, compared to a case in which each method is performed alone, and thus to reduce the overall amount of calculation.

Figure 14:
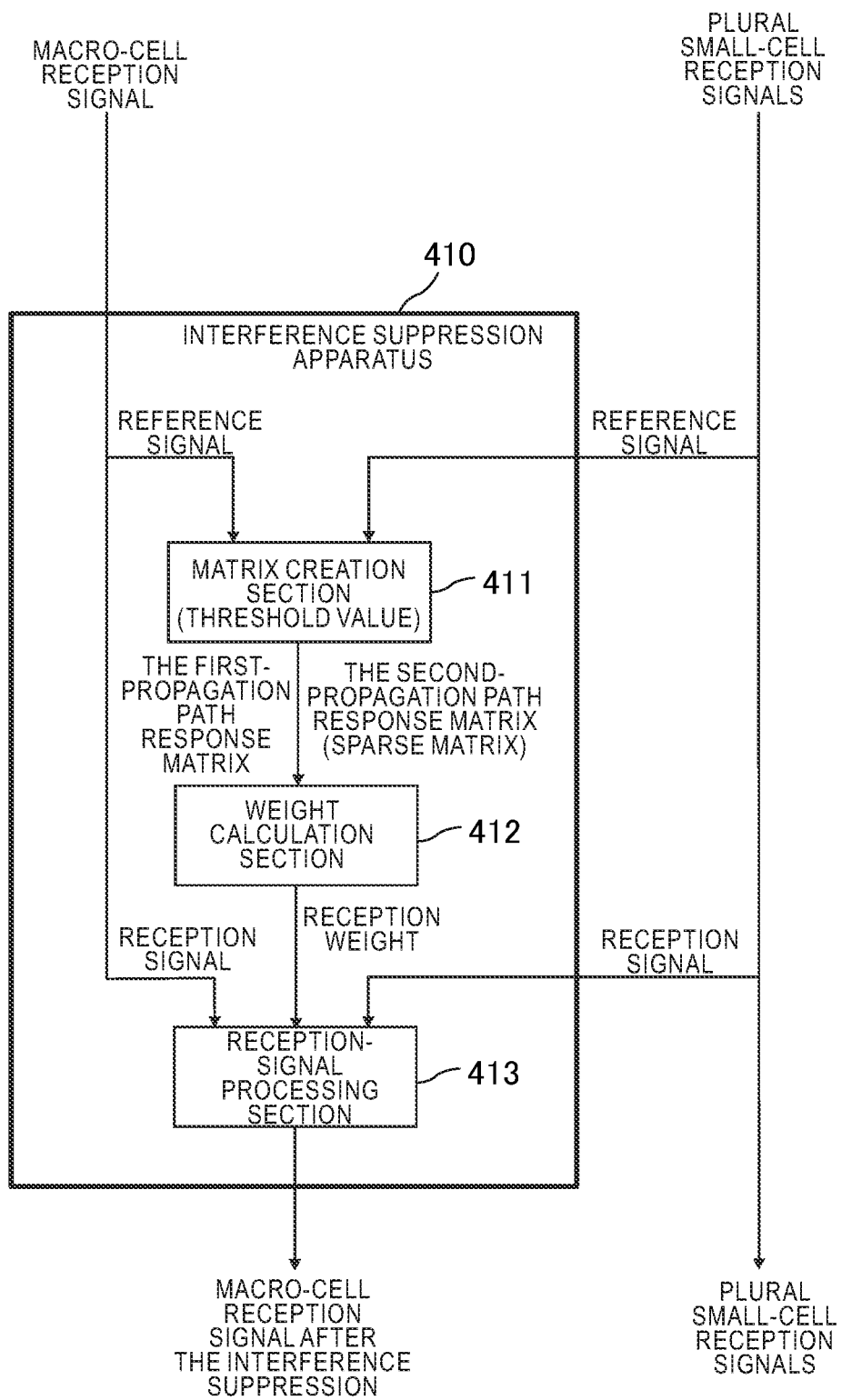
FIG. 14 is a block diagram showing an example of a configuration of the interference suppression apparatus according to the embodiment.

FIG. 14 is a block diagram showing an example of the configuration of the interference suppression apparatus 410 according to the embodiment. In FIG. 14, the interference suppression apparatus 410 is an apparatus that suppresses interference from terminals located in plural other cells to the base station of any one cell of the macro cell (first cell) and plural small cells (second cells). The interference suppression apparatus 410 suppresses the interference from the terminals 10(i) located in the plurality (N) of the small cells 300(i) (i=1 to N) to the macro-cell base station 20, for example, by executing a predetermined program on a computer or processor. The interference suppression apparatus 410 is provided with a matrix creation section 411, a weight calculation section 412 and a reception-signal processing section 413.

The matrix creation section 411 estimates a plurality of the first propagation-path responses from the plural terminals respectively located in the plural other cells to the antenna of the base station of the one cell, creates a first propagation-path response matrix including the plurality of the first propagation-path responses as elements, estimates a plurality of the second propagation-path responses from the plural terminals respectively located in the plural other cells to the antennas of the base stations of the plural other cells, and creates a second propagation-path response matrix including the plurality of the second propagation-path responses as elements.

For example, the matrix creation section 411 estimates a plurality of the first propagation-path responses hi from the plural small-cell terminals 10($i$) to the antenna 21 of the macro-cell base station 20 based on a reception signal (reference signal) of the macro-cell base station 20 that has received pilot signals transmitted from the plural small-cell terminals 10($i$) respectively located in the plural small cells (other cells) 300($i$), and creates the first propagation-path response matrix h including the plurality of the first propagation-path responses hi as elements. Furthermore, the matrix creation section 411 estimates a plurality of the second propagation-path responses $h_{ji}$ from the plural small-cell terminals 10($i$) to the antenna 31 of the base station 30($j$) of the plural small cells 300($j$) (j=1 to N), based on reception signals (reference signals) of the plural small-cell base stations 30($i$) that have received pilot signals transmitted from the plural small-cell terminals 10($i$), and creates the second propagation-path response matrix H including the plurality of the second propagation-path responses $h_{ji}$ as elements.

Furthermore, the matrix creation section 411 sets to zero the second propagation-path responses having electric power of magnitude less than or equal to the predetermined threshold value $\gamma_{th}$ or less than the threshold value $\gamma_{th}$, among the plurality of the second propagation-path responses $h_{ji}$ contained in the second propagation-path response matrix H before calculating the inverse matrix $H^{-1}$.

In addition, among the plurality of the second propagation-path responses $h_{ji}$ of the second propagation-path response matrix H created by the matrix creation section 411, the second propagation-path response $h_{ji}$ that is expected to have a small contribution to the interference for the reception signal of the macro-cell uplink may be set to zero in advance. For example, before the plural small-cell base stations 30($i$) start an operation, a plurality of the second propagation-path responses $h_{ji}$ are estimated, and among the plurality of the second propagation-path responses $h_{ji}$, the second propagation-path responses $h_{ji}$, in which the calculated values of electric power $P_{ji}$ thereof are equal to or less than the predetermined threshold value $\Gamma_{th}$ or less than the threshold value $\Gamma_{th}$, are set to zero. Moreover, for example, the second propagation-path response $h_{ji}$ that is set to zero in advance may be determined based on the positional relationship between the plural small-cell base stations 30($i$) or the positional relationship between the plural small cells 300($i$). The matrix creation section 411 does not estimate the second propagation-path response $h_{ji}$ that is set to zero in advance, among the plurality of the second propagation-path responses $h_{ji}$ of the second propagation-path response matrix H.

Furthermore, in case that the second propagation-path response $h_{ji}$ that is expected to have small contribution to the interference for the reception signal of the macro cell uplink is set to zero in advance, the matrix creation section 411 may further not estimate the second propagation-path response $h_{ji}$ that is set to zero in advance among the plurality of the second propagation-path responses $h_{ji}$ of the second propagation-path response matrix H, and may modify, to zero, the second propagation-path response in which the calculated value of the electric power thereof is equal to or less than the predetermined threshold value $\gamma_{th}$ or less than the threshold value $\gamma_{th}$, among the plurality of the second propagation-path responses that are not set to zero in advance.

The weight calculation section 412 calculates the inverse matrix $H^{-1}$ of the second propagation-path response matrix H, and calculates plural reception weights W to be applied to the reception signals received by the antennas of the base stations of the plural other cells, based on the inverse matrix $H^{-1}$ of the second propagation-path response matrix and the first propagation-path response matrix h.

For example, the weight calculation section 412 calculates the inverse matrix $H^{-1}$ of the second propagation-path response matrix H, and calculates plural reception weights Wi to be applied to reception signals received by the antennas 31 of the plural small-cell base stations 30($i$), based on the inverse matrix $H^{-1}$ of the second propagation-path response matrix and the first propagation-path response matrix h.

The reception-signal processing section 413 suppresses the interference from the plural terminals located in the plural other cells to the uplink line of the base station of the one cell, based on the reception signal received by the antenna of the base station of the one cell, plural reception signals received by the antennas of the base stations of the plural other cells, and the plural reception weights.

For example, the reception-signal processing section 413 suppresses the interference from the plural small cell terminals 10($i$) to the uplink of the macro-cell base station 20, based on a reception signal X(0) received by the antenna 21 of the macro-cell base station 20, plural reception signals X(i) received by the antennas 31 of the plural small-cell base stations 30($i$), and plural reception weights Wi.

It is noted that, although FIG. 14 exemplifies the interference suppression apparatus 410 that suppresses the interference from the terminals 10($i$) located in the plural (N) small cells 300($i$) (i=1 to N) to the macro-cell base station 20, the interference suppression apparatus 410 may be an apparatus that suppresses the interference from the terminals 10($i$) located in other small cells and the terminal 10(0) located in the macro cell 200 to the base station of any one of the plural small cells 300($i$).

As described above, according to the present embodiments, in the HetNet configuration in which the plural small cells are disposed within the macro cell, it is possible to suppress the interference from the small cells to the uplink reception signals received by the macro-cell base station, while reducing the amount of signal processing required to calculate the reception weights to suppress the interference, and also reducing the number of measurements of the second propagation-path responses in all of the cells, which are required for the calculation.

Since the present invention is capable of providing the system that can suppress the macro-cell uplink reception interference while reducing the load of signal processing amount on the base stations in the HetNet configuration in which the plural small cells are disposed within the macro cell, it is possible to contribute to achieving Goal 9 of the Sustainable Development Goals (SDGs), which is to "Create a foundation for industry and technological innovation".

It is noted that, the process steps and configuration elements of the system, the interference suppression apparatus, the radio apparatus, the base station, the radio relay station (feeder station), and the terminal (user apparatus, mobile station, mobile device) described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various kinds of radio communication apparatuses, radio relay apparatus, Node B, server, gateway, switching equipment, computer, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: terminal
20: macro-cell base station
21: antenna
30: small-cell base station
31: antenna
40: cooperative control network
50: communication line
200: macro cell
300: small cell
400: cooperative control network
410: interference suppression apparatus
411: matrix creation section
412: weight calculation section
413: reception-signal processing section
420: receiver
430: receiver

The invention claimed is:

1. An interference suppression apparatus for suppressing interference from terminals located in plural other cells to a base station of any one cell of a first cell and plural second cells in a cellular network configuration that uses a same frequency band and includes the first cell formed by a first base station and the plural second cells formed within the first cell by plural second base stations, the interference suppression apparatus comprising:

a matrix creation section that estimates a plurality of first propagation-path responses from plural terminals respectively located in the plural other cells to an antenna of the base station of the one cell, creates a first propagation-path response matrix including the plurality of the first propagation-path responses as elements, estimates a plurality of second propagation-path responses from plural terminals respectively located in the plural other cells to antennas of base stations of the plural other cells, and creates a second propagation-path response matrix including the plurality of the second propagation-path responses as elements;

a weight calculation section that calculates an inverse matrix of the second propagation-path response matrix, and calculates plural reception weights to be applied to reception signals received by the antennas of the base stations of the plural other cells, based on the first propagation-path response matrix and the inverse matrix of the second propagation-path response matrix; and a reception-signal processing section that suppresses interference from plural terminals located in the plural other cells to an uplink of the base station of the one cell, based on a reception signal received by the antenna of the base station of the one cell, plural reception signals received by the antennas of the base stations of the plural other cells, and the plural reception weights, and wherein, before starting an operation of the cellular network configuration, the interference suppression apparatus performs a pre-estimation process for the plurality of the second propagation-path responses between the small cells in advance, and pre-sets to zero a second propagation-path response that is expected to have a small contribution to the interference, among the plurality of the second propagation-path responses of the second propagation-path response matrix to be used for creating the second propagation-path response matrix in the matrix creation section, based on a result of the pre-estimation process, and wherein, when operating the cellular network configuration, the matrix creation section does not estimate the second propagation-path response that is pre-set to zero among the plurality of the second propagation-path responses of the second propagation-path response matrix.

2. The interference suppression apparatus according to claim 1,
wherein the one cell is the first cell,
wherein the base station of the one cell is the first base station,
wherein the other cells are the second cells, and
wherein the base stations of the other cells are the second base stations.

3. The interference suppression apparatus according to claim 2,
wherein the matrix creation section modifies to zero a second propagation-path response in which the calculated value of the electric power is equal to or less than a predetermined threshold value $\Gamma_{th}$ or less than the threshold value $\Gamma_{th}$, among the plurality of the second propagation-path responses that are not pre-set to zero.

4. The interference suppression apparatus according to claim 2,
wherein the interference suppression apparatus estimates the plurality of the second propagation-path responses before the plural second base stations start an operation, and sets to zero a second propagation-path response in which the calculated value of the electric power of the second propagation-path response is equal to or less than a predetermined threshold value $\Gamma_{th}$ or less than the threshold value $\Gamma_{th}$, among the plurality of the second propagation-path responses.

5. The interference suppression apparatus according to claim 2,
wherein the interference suppression apparatus determines a second propagation-path response that is to be pre-set to zero, based on a positional relationship between the plural second base stations or a positional relationship between the plural second cells.

6. The interference suppression apparatus according to claim 2,
wherein the interference suppression apparatus is provided in a common baseband processing section that is connected to each of a radio section of the first base station and radio sections of the plural second base stations via a communication line.

7. A system of a cellular network configuration, comprising:
a first base station that forms a first cell; and
plural second base stations that respectively form plural second cells, each of the plural second cells having a smaller cell size than the first cell disposed within the first cell, and
wherein a same frequency band is used for a radio communication of a terminal located in the first cell and a radio communication of a terminal located in each of the plural second cells,
wherein the system comprises the interference suppression apparatus according to claim 2.

8. The interference suppression apparatus according to claim 1,
wherein the one cell is the second cell,
wherein the base station of the one cell is the second base station,
wherein the other cells are the first cell and other second cells, and
wherein the base stations of the other cells are the first base station and other second base stations.

9. The interference suppression apparatus according to claim 8,
wherein the matrix creation section modifies to zero a second propagation-path response in which the calculated value of the electric power is equal to or less than a predetermined threshold value $\Gamma_{th}$ or less than the threshold value $\Gamma_{th}$, among the plurality of the second propagation-path responses that are not pre-set to zero.

10. The interference suppression apparatus according to claim 8,
wherein the interference suppression apparatus estimates the plurality of the second propagation-path responses before the plural second base stations start an operation, and sets to zero a second propagation-path response in which the calculated value of the electric power of the second propagation-path response is equal to or less than a predetermined threshold value $\Gamma_{th}$ or less than the threshold value $\Gamma_{th}$, among the plurality of the second propagation-path responses.

11. The interference suppression apparatus according to claim 8,
wherein the interference suppression apparatus determines a second propagation-path response that is to be pre-set to zero, based on a positional relationship between the plural second base stations or a positional relationship between the plural second cells.

12. The interference suppression apparatus according to claim 8,
wherein the interference suppression apparatus is provided in a common baseband processing section that is connected to each of a radio section of the first base station and radio sections of the plural second base stations via a communication line.

13. A system of a cellular network configuration, comprising:
a first base station that forms a first cell; and
plural second base stations that respectively form plural second cells, each of the plural second cells having a smaller cell size than the first cell disposed within the first cell, and
wherein a same frequency band is used for a radio communication of a terminal located in the first cell and a radio communication of a terminal located in each of the plural second cells,
wherein the system comprises the interference suppression apparatus according to claim 8.

14. The interference suppression apparatus according to claim 1,
wherein the matrix creation section modifies to zero a second propagation-path response in which the calculated value of the electric power is equal to or less than a predetermined threshold value $\Gamma_{th}$ or less than the threshold value $\Gamma_{th}$, among the plurality of the second propagation-path responses that are not pre-set to zero.

15. The interference suppression apparatus according to claim 1,
wherein the interference suppression apparatus estimates the plurality of the second propagation-path responses before the plural second base stations start an operation, and sets to zero a second propagation-path response in which the calculated value of the electric power of the second propagation-path response is equal to or less than a predetermined threshold value $\Gamma_{th}$ or less than the threshold value $\Gamma_{th}$, among the plurality of the second propagation-path responses.

16. The interference suppression apparatus according to claim 1,
  wherein the interference suppression apparatus determines a second propagation-path response that is to be pre-set to zero, based on a positional relationship between the plural second base stations or a positional relationship between the plural second cells.

17. The interference suppression apparatus according to claim 1,
  wherein the interference suppression apparatus is provided in a common baseband processing section that is connected to each of a radio section of the first base station and radio sections of the plural second base stations via a communication line.

18. A system of a cellular network configuration, comprising:
  a first base station that forms a first cell; and
  plural second base stations that respectively form plural second cells, each of the plural second cells having a smaller cell size than the first cell disposed within the first cell, and
  wherein a same frequency band is used for a radio communication of a terminal located in the first cell and a radio communication of a terminal located in each of the plural second cells,
  wherein the system comprises the interference suppression apparatus according to claim 1.

* * * * *